US012707001B2

(12) United States Patent
La et al.

(10) Patent No.: US 12,707,001 B2

(45) Date of Patent: Aug. 11, 2026

(54) ELECTRONIC DEVICE INCLUDING FOLDABLE DISPLAY MODULE

(71) Applicant: SAMSUNG DISPLAY CO., LTD., Yongin-si (KR)

(72) Inventors: Sojeong La, Yongin-si (KR); Jaiku Shin, Yongin-si (KR); Sung Chul Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/970,496

(22) Filed: Dec. 5, 2024

(65) Prior Publication Data

US 2025/0193299 A1 Jun. 12, 2025

(30) Foreign Application Priority Data

Dec. 8, 2023 (KR) ........................ 10-2023-0177191

(51) Int. Cl.
*H04M 1/02* (2006.01)
*G06F 3/046* (2006.01)

(52) U.S. Cl.
CPC .......... *H04M 1/0268* (2013.01); *G06F 3/046* (2013.01); *H04M 1/0216* (2013.01); *H04M 2250/22* (2013.01)

(58) Field of Classification Search
CPC ...... G06F 1/1652; G06F 1/203; G06F 1/1641; G06F 1/1681; G06F 3/046; G06F 1/1643; G06F 2203/04107; G06F 2203/04102; H04M 1/0268; H04M 1/0216;
(Continued)

(56) References Cited

U.S. PATENT DOCUMENTS 11,614,777 B2 3/2023 Kishimoto et al.
11,762,419 B2 9/2023 Lee et al.
11,816,299 B2 11/2023 Nam
(Continued)

FOREIGN PATENT DOCUMENTS

KR 10-2022-0031838 3/2022
KR 10-2022-0042022 4/2022
(Continued)

OTHER PUBLICATIONS

European search report, cited in European Application No. 24217934.9, dated Apr. 22, 2025.

*Primary Examiner* — Deeprose Subedi
(74) *Attorney, Agent, or Firm* — F. CHAU & ASSOCIATES, LLC

(57) ABSTRACT

An electronic device includes a display module including a first non-folding area and a second non-folding area spaced apart from each other, a folding area to be folded about a folding axis where the folding area is interposed between the non-folding areas, a digitizer disposed under the display module, a cushion layer disposed under the digitizer and including a first cushion layer overlapping the first non-folding area and a second cushion layer spaced apart from the first cushion layer and overlapping the second non-folding area, and a shielding layer disposed under the cushion layer and including a first shielding layer overlapping the first cushion layer and a second shielding layer spaced apart from the first shielding layer and overlapping the second non-folding area.

22 Claims, 12 Drawing Sheets

(58) Field of Classification Search
CPC ... H04M 2250/22; H10K 59/65; H10K 59/40; H10K 59/131; H10K 2102/311
See application file for complete search history.

(56) References Cited

U.S. PATENT DOCUMENTS

| | | | | |
|---|---|---|---|---|
| 11,860,691 | B2 | 1/2024 | La et al. | |
| 2022/0100234 | A1* | 3/2022 | Kishimoto | G06F 3/0446 |
| 2022/0113824 | A1 | 4/2022 | Kishimoto et al. | |
| 2022/0312612 | A1 | 9/2022 | An et al. | |
| 2023/0008810 | A1 | 1/2023 | Shin et al. | |
| 2023/0236629 | A1 | 7/2023 | Kishimoto et al. | |
| 2023/0244272 | A1 | 8/2023 | Lee et al. | |

FOREIGN PATENT DOCUMENTS

| | | | |
|---|---|---|---|
| KR | 10-2022-0053464 | | 4/2022 |
| KR | 10-2022-0167844 | A | 12/2022 |
| KR | 10-2023-0086023 | | 6/2023 |
| KR | 20230141388 | | 10/2023 |

* cited by examiner

DD-2
BP
PF
AD0
UTG
AD1
DL
AD2
AD3
WM
UM
A4-2
CF-2
TPU
AD5-2
T-2
AD6-2
CS-2
AD7-2
M-2
AD8-2
CP-2
LM
NFA2
FA
NFA1
SC-R
PF-R
SC-L
PF-L
ST-R
ST-L
M-R
M-L
PN-2
PN-1
DM
PPL
CF-3
AD4-1
CF-1
C-H
AD5-1
T-1
AD6-1
CS-1
AD7-1
M-1
AD8-1
CP-1
AD8-1 AD8-2 AD8
AD6-1 AD6-2 AD6
AD7-1 AD7-2 AD7
AD4-1 AD4-2 AD4
AD5-1 AD5-2 AD5
CP-1 CP-2 CP
M-1 M-2 MMN
SC-L SC-R SC-2
CS-1 CS-2 CS
T-1 T-2 DTM-2
M-L M-R MMF-2
PN-1 PN-2 PL-2
PF-L PN-F
PF-R
CF-1 CF-2 CF-3 CFR

ELECTRONIC DEVICE INCLUDING FOLDABLE DISPLAY MODULE

CROSS-REFERENCE TO RELATED APPLICATIONS

This patent application claims priority under 35 U.S.C. § 119 to Korean Patent Application No. 10-2023-0177191 filed on Dec. 8, 2023, in the Korean Intellectual Property Office, the disclosure of which is incorporated by reference in its entirety herein.

1. Technical Field

Embodiments of the present disclosure described herein are directed to an electronic device including a digitizer, and more particularly, to an electronic device having increased impact resistance.

2. Discussion of Related Art

In the information society, importance of electronic devices as a visual information transmission medium is increasing. A touch display device includes a display layer displays an image and a touchscreen layer for sensing a touch. The touchscreen layer may include a digitizer that senses an input from a stylus pen.

The digitizer of the electronic device may include sensing coils that create a magnetic field to sense a touch or approach of the stylus pen. However, the digitizer may become damaged if the touch display device receives a large impact.

SUMMARY

Embodiments of the present disclosure provide an electronic device having a laminated structure for alleviating an impact to a digitizer that senses an external input.

According to an embodiment, an electronic device includes a display module, a digitizer, a cushion layer and a shielding layer. The display module includes a first non-folding area and a second non-folding area spaced apart from each other and a folding area to be folded about a folding axis that is interposed between the non-folding areas. The digitizer is disposed under the display module. The cushion layer is disposed under the digitizer and includes a first cushion layer overlapping the first non-folding area and a second cushion layer spaced apart from the first cushion layer and overlapping the second non-folding area. The shielding layer is disposed under the cushion layer and includes a first shielding layer overlapping the first cushion layer and a second shielding layer spaced apart from the first shielding layer and overlapping the second non-folding area.

The shielding layer may include magnetic metal powder (MMP).

The electronic device may further include a heat dissipating layer disposed under the shielding layer and including a first heat dissipating layer overlapping the first shielding layer and a second heat dissipating layer spaced apart from the first heat dissipating layer and overlapping the second shielding layer.

The electronic device may further include a plate disposed under the heat dissipating layer and including a first support part coupled to the first heat dissipating layer, a second support part coupled to the second heat dissipating layer, and a folding support part disposed between the first support part and the second support part.

The folding support part may include a first folding support portion disposed adjacent to the first non-folding area, a second folding support portion disposed adjacent to the second non-folding area, and a center support portion disposed between the first folding support portion and the second folding support portion, and the electronic device may further include folding shielding layers each disposed between the folding area and the folding support part and including step compensating layers and magnetic metal powder (MMP).

The step compensating layers may be disposed on the first folding support portion, the second folding support portion, and the center support portion, and the folding shielding layers may be disposed on the step compensating layers.

The folding shielding layers may be disposed on the first folding support portion, the second folding support portion, and the center support portion, and the step compensating layers may be disposed on the shielding layers.

The electronic device may further include an adhesive layer that includes a first adhesive layer disposed between the digitizer and the cushion layer, a second adhesive layer disposed between the cushion layer and the shielding layer, and a third adhesive layer disposed between the shielding layer and the heat dissipating layer, and each of the first adhesive layer, the second adhesive layer, and the third adhesive layer may include a first part overlapping the first non-folding area and a second part spaced apart from the first part with the folding area interposed therebetween and overlapping the second non-folding area.

Each of the first adhesive layer, the second adhesive layer, and the third adhesive layer may include an optical clear adhesive (OCA), an optical clear resin (OCR), or a pressure sensitive adhesive (PSA).

A thickness of the cushion layer may be in a range of 60 μm to 200 μm.

The digitizer may overlap the folding area, and include holes.

The electronic device may further include a cover pattern that is disposed under the digitizer to overlap the folding area and cover the holes.

The digitizer may include a first digitizer overlapping the first non-folding area and a portion of the folding area and a second digitizer spaced apart from the first digitizer and overlapping the second non-folding area and another portion of the folding area.

The electronic device may further include an upper plate disposed on the digitizer, and the upper plate may overlap the folding area, and include holes.

The upper plate may include a matrix part and a reinforced fiber composite disposed inside the matrix part, and the reinforced fiber composite may include carbon fiber reinforced plastic (CFRP) and a glass fiber reinforced plastic (GFRP).

The electronic device may further include a panel protecting layer disposed between the digitizer and the display module and including a flexible synthetic resin film.

The electronic device may further include an upper film disposed on the display module and including a synthetic resin film.

The electronic device may further include a window disposed on the upper film, wherein the window may include a thin film glass substrate disposed on the upper film, a window protecting layer disposed on the thin film glass substrate, and an adhesive layer disposed between the thin film glass substrate and the upper film.

The digitizer may include a plurality of base layers and sensing coils arranged between the base layers and including copper, each of the base layers may include a matrix part and a reinforced fiber composite disposed inside the matrix part, and the reinforced fiber composite may include carbon fiber reinforced plastic (CFRP) or a glass fiber reinforced plastic (GFRP).

The digitizer may sense an external input in an electromagnetic resonance (EMR) manner.

According to an embodiment, an electronic device includes a display module, a digitizer, a first cushion layer, a second cushion layer, a first shielding layer and a second shielding layer. The display module includes a first non-folding area and a second non-folding area spaced apart from each other, and a folding area to be folded about a folding axis, where the folding area is interposed between the first non-folding area and the second non-folding area. The digitizer is disposed under the display module. The first cushion layer is disposed under a first part of the digitizer to overlap the first non-folding area. The second cushion layer is disposed under a second part of the digitizer that is spaced apart from the first part to overlap the second non-folding area. The first shielding layer is disposed under the first cushion layer. The second shielding layer is disposed under the second cushion layer.

According to an embodiment, an electronic device includes a flexible display module, an integrated digitizer, and a protective assembly beneath the digitizer. The flexible display module is segmented into a first non-folding area, a second non-folding area, and an intervening folding area configured to fold about a designated folding axis. The integrated digitizer is disposed beneath the display module and configured to sense input across both the folding and the non-folding areas via electromagnetic resonance. The protective assembly includes: a first cushion layer positioned under the first non-folding area and a second cushion layer positioned under the second non-folding area; and a first shielding layer disposed under the first cushion layer and a second shielding layer disposed under the second cushion layer, the first shielding layer providing electromagnetic shielding.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1A:
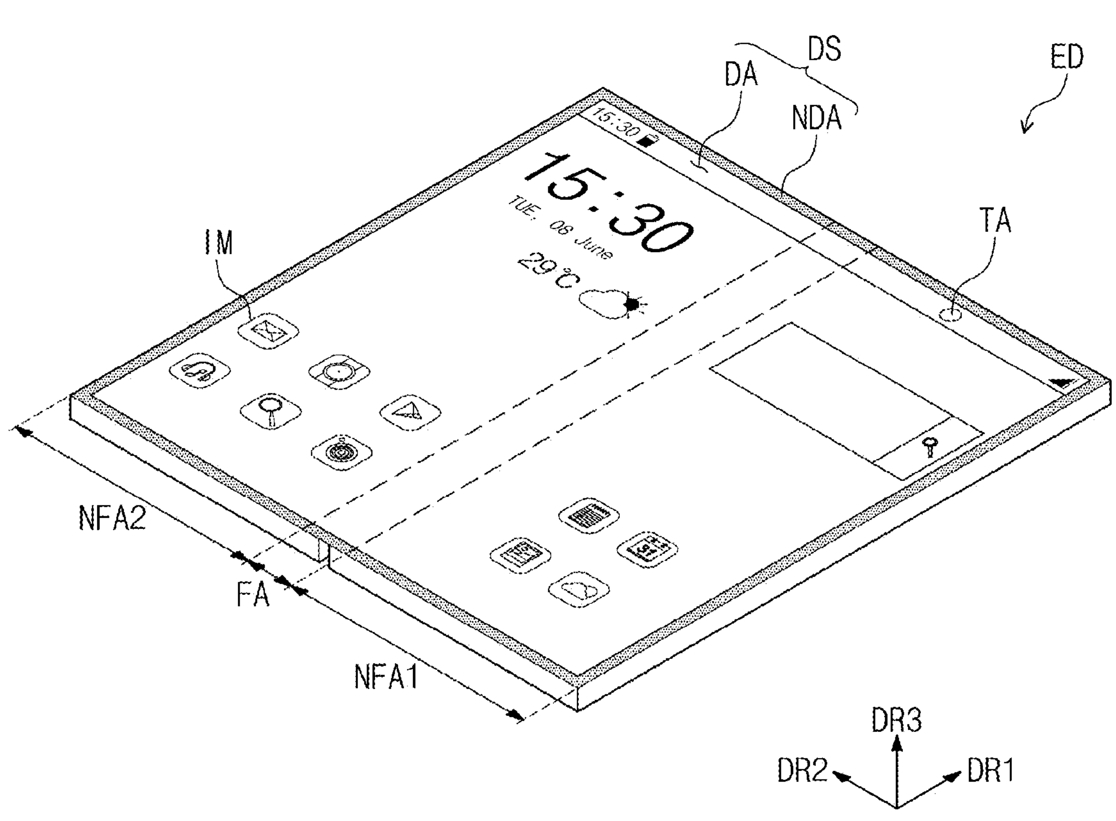
FIGS. 1A to 1C are perspective views of an electronic device according to an embodiment of the present disclosure.

In the specification, the expression that a first component (or area, layer, part, portion, etc.) is "on", "connected with", or "coupled to" a second component means that the first component is directly on, connected with, or coupled to the second component or means that a third component is disposed therebetween.

The same reference numerals refer to the same components. The expression "and/or" includes one or more combinations which associated components are capable of defining. Singular expressions include plural expressions unless clearly otherwise indicated in the context.

Hereinafter, embodiments of the present disclosure will be described with reference to the accompanying drawings.

Figure 1B:
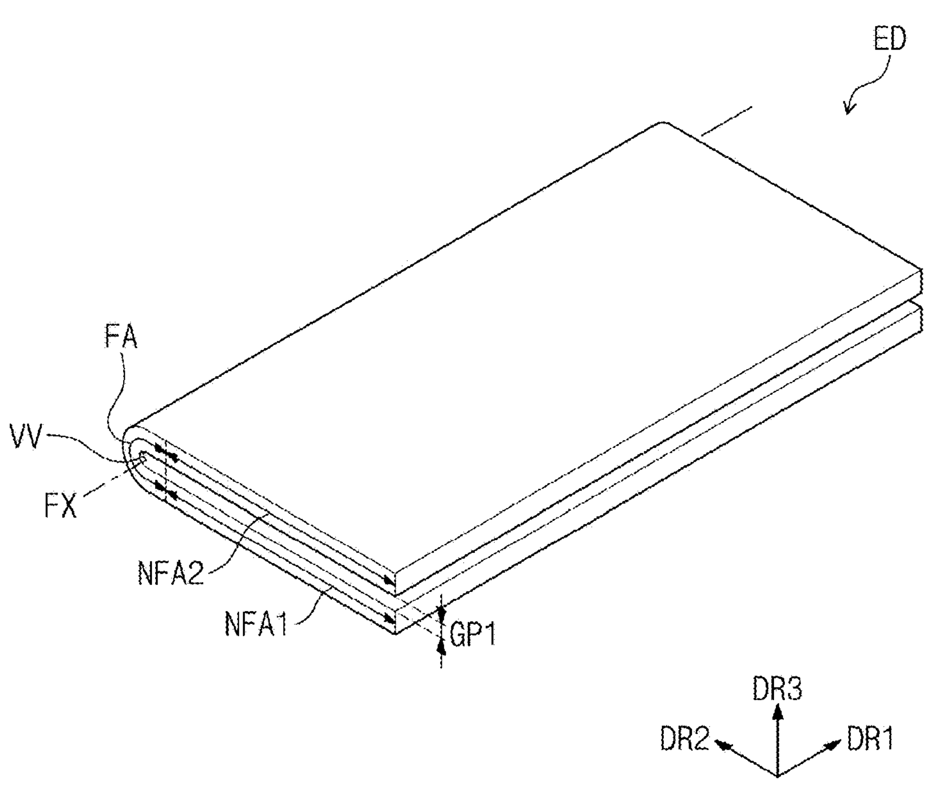
Figure 1C:
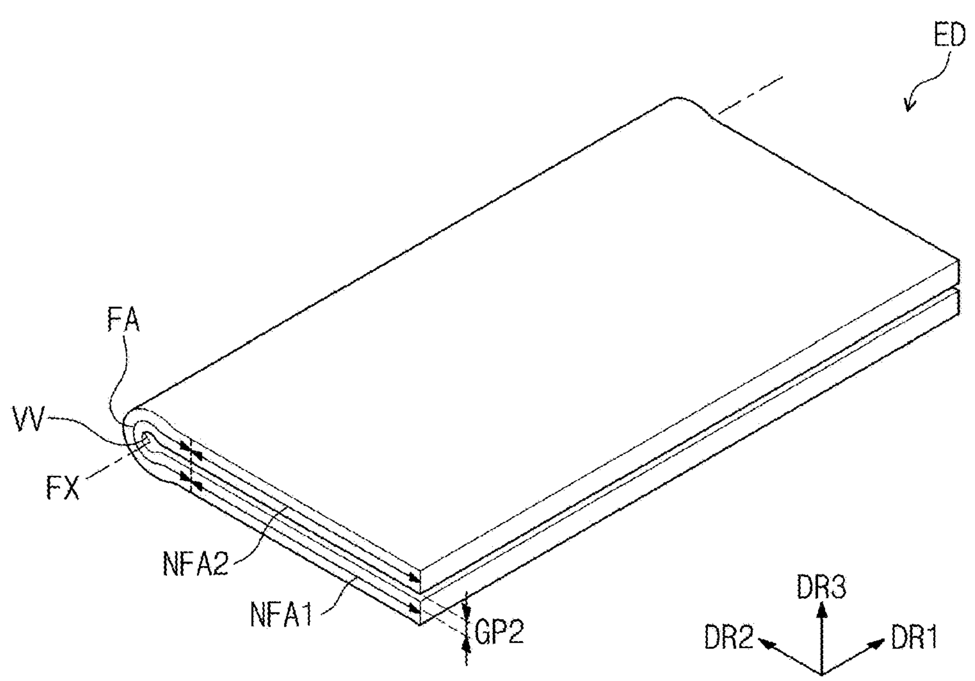

FIGS. 1A to 1C are perspective views of an electronic device according to an embodiment of the present disclosure. FIG. 1A illustrates an unfolded state of the electronic device, and FIGS. 1B and 1C illustrate a folded state of the electronic device.

Referring to FIGS. 1A to 1C, an electronic device ED according to an embodiment of the present disclosure includes a display surface DS defined by a first direction DR1 and a second direction DR2 intersecting the first direction DR1. The electronic device ED may provide an image IM to a user through the display surface DS.

The display surface DS may include a display area DA and a non-display area NDA adjacent to the display area DA. The display area DA is configured to display the image IM, and the non-display area NDA is not configured to display the image IM. The non-display area NDA may surround at least a portion of the display area DA. However, the present disclosure is not limited thereto, and the shape of the display area DA and the shape of the non-display area NDA may be modified.

The display surface DS of the electronic device ED according to an embodiment includes a sensing area TA. The sensing area TA may be an area defined inside the display area DA. In an embodiment, the sensing area TA has higher light transmittance than those of other areas of the display area DA.

An optical signal, for example, a visible light or an infrared light, may be transmitted to the sensing area TA. The electronic device ED may capture an external image through the visible light passing through the sensing area TA or determine accessibility of an external object through the infrared light. FIG. 1A illustrates one sensing area TA, but the present disclosure is not limited thereto, and the sensing area TA may be provided in plurality.

Hereinafter, a direction substantially perpendicular to a plane defined by the first direction DR1 and the second direction DR2 is defined as a third direction DR3. The third direction DR3 serves as a standard for distinguishing a front surface and a rear surface of each of members. In the specification, the wording "on a plane" may be defined as a state viewed in the third direction DR3.

The electronic device ED may include a folding area FA and a plurality of non-folding areas NFA1 and NFA2. The non-folding areas NFA1 and NFA2 may include the first non-folding area NFA1 and the second non-folding area NFA2. The first non-folding area NFA1 and the second non-folding area NFA2 may be spaced apart from each other in the second direction DR2 with the folding area FA interposed therebetween.

As illustrated in FIG. 1B, the folding area FA may be folded about a folding axis FX parallel to the first direction DR1. When the electronic device ED is folded about the folding axis FX, the folding area FA has a predetermined curvature and a radius VV of curvature. A first separation distance GP1 between the first non-folding area NFA1 and the second non-folding area NFA2 may be similar to or equal to twice the radius VV of curvature. According to an embodiment, when the electronic device ED is folded about the folding axis FX, the first non-folding area NFA1 and the second non-folding area NFA2 may be folded in an in-folding manner such that the first non-folding area NFA1 and the second non-folding area NFA2 face each other and the display surface DS is not exposed to the outside.

As illustrated in FIG. 1C, according to an embodiment, when the electronic device ED is folded about the folding axis FX, a second separation distance GP2 between the first non-folding area NFA1 and the second non-folding area NFA2 may be smaller than twice the radius VV of curvature. Thus, in the folded state, the separation distance between the first non-folding area NFA1 and the second non-folding area NFA2 may be reduced. Accordingly, the electronic device ED having a slim state when being folded may be provided.

However, the present disclosure is not limited thereto, and in an embodiment, the electronic device ED may be out-folded such that the display surface DS is exposed to the outside. In an embodiment of the present disclosure, the electronic device ED may be configured such that the switch from the unfolded operation to an in-folding or out-folding operation and the switch from the in-folding or out-folding operation to the unfolded operation are repeated, but is not limited thereto. In an embodiment of the present disclosure, the electronic device ED may select any one of the unfolding operation, the in-folding operation, and the out-folding operation.

Figure 2A:
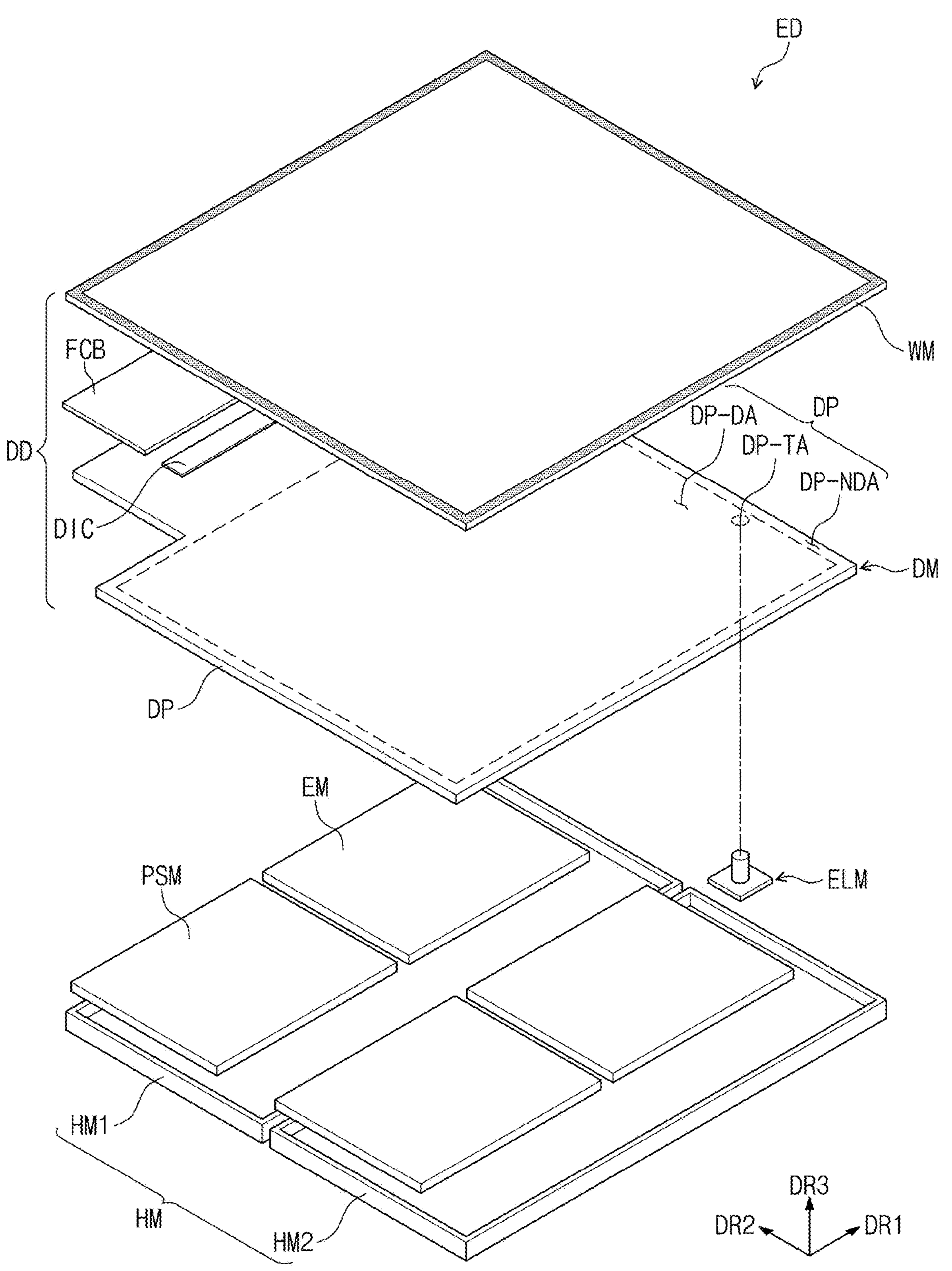
FIG. 2A is an exploded perspective view of the electronic device according to an embodiment of the present disclosure.
Figure 2B:
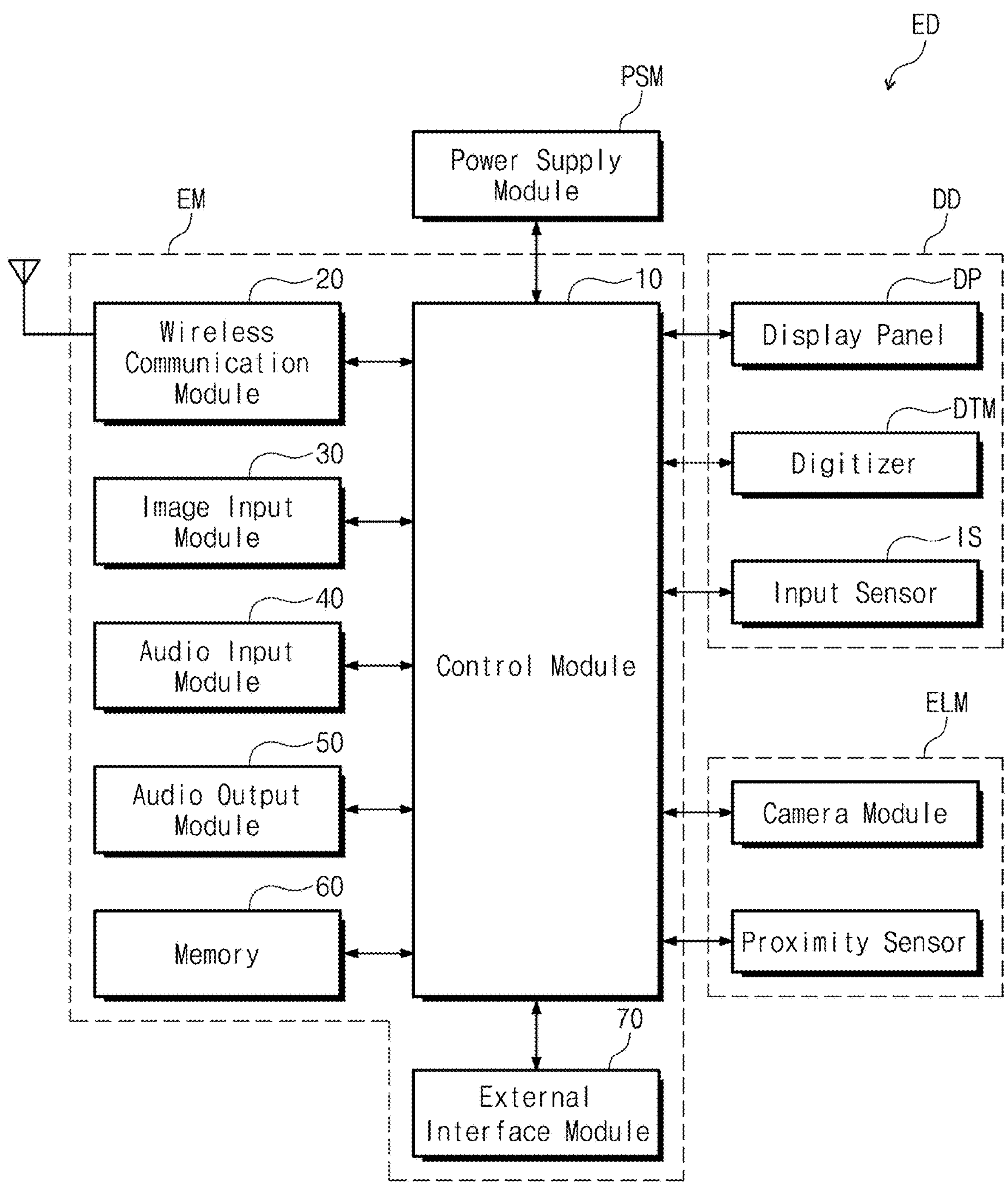
FIG. 2B is a block diagram of the electronic device according to an embodiment of the present disclosure.

FIG. 2A is an exploded perspective view of the electronic device according to an embodiment of the present disclosure. FIG. 2B is a block diagram of the electronic device according to an embodiment of the present disclosure.

Referring to FIGS. 2A and 2B, the electronic device ED may include a display device DD, an electronic module EM (e.g., a first circuit), an electro-optical module ELM (e.g., a second circuit), a power supply module PSM (e.g., a power supply), and a housing HM. The electronic device ED according to an embodiment may further include a mechanical structure (e.g., a hinge) that is coupled to the housing HM and controls a folding operation of the display device DD.

The display device DD generates an image and senses an external input. The display device DD includes a window WM and a display module DM. The window WM provides the display surface DS of the electronic device ED.

The display module DM may include a display panel DP. Although FIG. 2A illustrates only the display panel DP among laminated structures of the display module DM, the display module DM may further include a plurality of components arranged on the display panel DP. The laminated structures of the display module DM will be described below in detail.

The display panel DP may be one of a liquid crystal display panel, an electrophoretic display panel, a microelectromechanical system (MEMS) display panel, an electrowetting display panel, an organic light emitting display panel, an inorganic light emitting display panel, and quantum-dot display panel, but the type of the display panel DP is not limited thereto. Further, the display panel DP according to an embodiment of the present disclosure may be included in an ultra-small light emitting device, but the present disclosure is not limited thereto.

The display panel DP includes a display area DP-DA and a non-display area DP-NDA corresponding to the display area DA (see FIG. 1A) and the non-display area NDA (see FIG. 1A) of the electronic device ED. In the specification, an expression "an area/part and an area/part correspond to each other" means that the area/part and the area/part overlap each other and are not limited to the same area.

As illustrated in FIG. 2A, a driving chip DIC may be disposed on the non-display area DP-NDA of the display panel DP. A flexible circuit board FCB may be coupled to the non-display area DP-NDA of the display panel DP. The flexible circuit board FCB may be connected to a main circuit board. The main circuit board may be one electronic component constituting the electronic module EM.

The driving chip DIC may include driving elements, for example, a data driving circuit, for driving pixels of the display panel DP. Although FIG. 2A illustrates a structure in which the driving chip DIC is mounted on the display panel DP, the present disclosure is not limited thereto. For example, the driving chip DIC may be mounted on the flexible circuit board FCB.

In the display module DM according to an embodiment, a portion of the non-display area DP-NDA may be bent. For example, an area of the non-display area DP-NDA, in which the driving chip DIC and the flexible circuit board FCB are arranged and of which a width is narrowed in the first direction DR1, may be bent about a bending axis extending in the first direction DR1. In this case, the bent non-display area DP-NDA of the display module DM may be accommodated in the housing HM in a bent state.

As illustrated in FIG. 2B, the display device DD may further include an input sensor IS and a digitizer DTM in addition to the display panel DP. The input sensor IS senses input of the user. The input sensor IS that senses an external input in a capacitive manner may be disposed on the display panel DP. The digitizer DTM detects input of a stylus pen. The digitizer DTM according to the present disclosure may sense an external input in an electromagnetic resonance (EMR) manner. The digitizer DTM may be disposed under the display panel DP.

The electronic module EM may include a control module 10 (e.g., a controller circuit), a wireless communication module 20 (e.g., a wireless communication circuit), an image input module 30 (e.g., a first input circuit), an audio input module 40 (e.g., a second input circuit or a microphone), an audio output module 50 (e.g., an output circuit or a speaker), a memory 60, and an external interface module 70 (e.g., an interface circuit). The electronic module EM may include the main circuit board, and the modules may be mounted on the main circuit board or may be electrically connected to the main circuit board through the flexible circuit board. Each of the input sensor IS and the digitizer DTM may be connected to the main circuit board through a connector. The electronic module EM is electrically connected to the power supply module PSM.

Referring to FIG. 2A, the electronic module EM may be disposed in each of a first housing HM1 and a second housing HM2, and the power supply module PSM may be disposed in each of the first housing HM1 and the second housing HM2. The electronic module EM disposed in the first housing HM1 and the electronic module EM disposed in the second housing HM2 may be electrically connected to each other through the flexible circuit board.

The control module 10 controls the overall operation of the electronic device ED. For example, the control module 10 may activate or deactivate the display device DD in accordance with a user input. The control module 10 may control the image input module 30, the audio input module 40, and the audio output module 50 in accordance with the user input. The control module 10 may include at least one microprocessor.

The wireless communication module 20 may transmit/receive a wireless signal to/from another terminal using a Bluetooth line or a Wi-Fi line. The wireless communication module 20 may transmit/receive a voice signal using a general communication line. The wireless communication module 20 may include a plurality of antenna modules.

The image input module 30 nay process an image signal and convert the processed image signal into image data that may be displayed on the display device DD. The audio input module 40 may receive an external audio signal through a microphone in a recording mode or a voice recognition mode, and convert the received external audio signal into electrical voice data. The audio output module 50 may convert audio data received from the wireless communication module 20 or audio data stored in the memory 60 into a sound and output the converted sound to the outside.

The external interface module 70 may serve as an interface connected to an external charger, a wired/wireless data port or a card socket (e.g., a memory card and a subscriber identification module (SIM)/user identification module (UIM) card).

The power supply module PSM may supply power required for the overall operation of the electronic device ED. The power supply module PSM may include a battery device.

The electro-optical module ELM may be an electronic component that outputs or receives an optical signal. The electro-optical module ELM may include a camera module and/or a proximity sensor. The camera module may be configured to capture an external image through a sensing area DP-TA. The electro-optical module ELM may be disposed under the display device DD and may overlap the sensing area DP-TA.

The housing HM is coupled to the window WM to accommodate the other above-described modules. It is illustrated that the housing HM includes the first housing HM1 and the second housing HM2, but the present disclosure is not limited thereto. The electronic device ED according to an embodiment may further include a hinge structure for connecting the first housing HM1 and the second housing HM2.

Figure 3A:
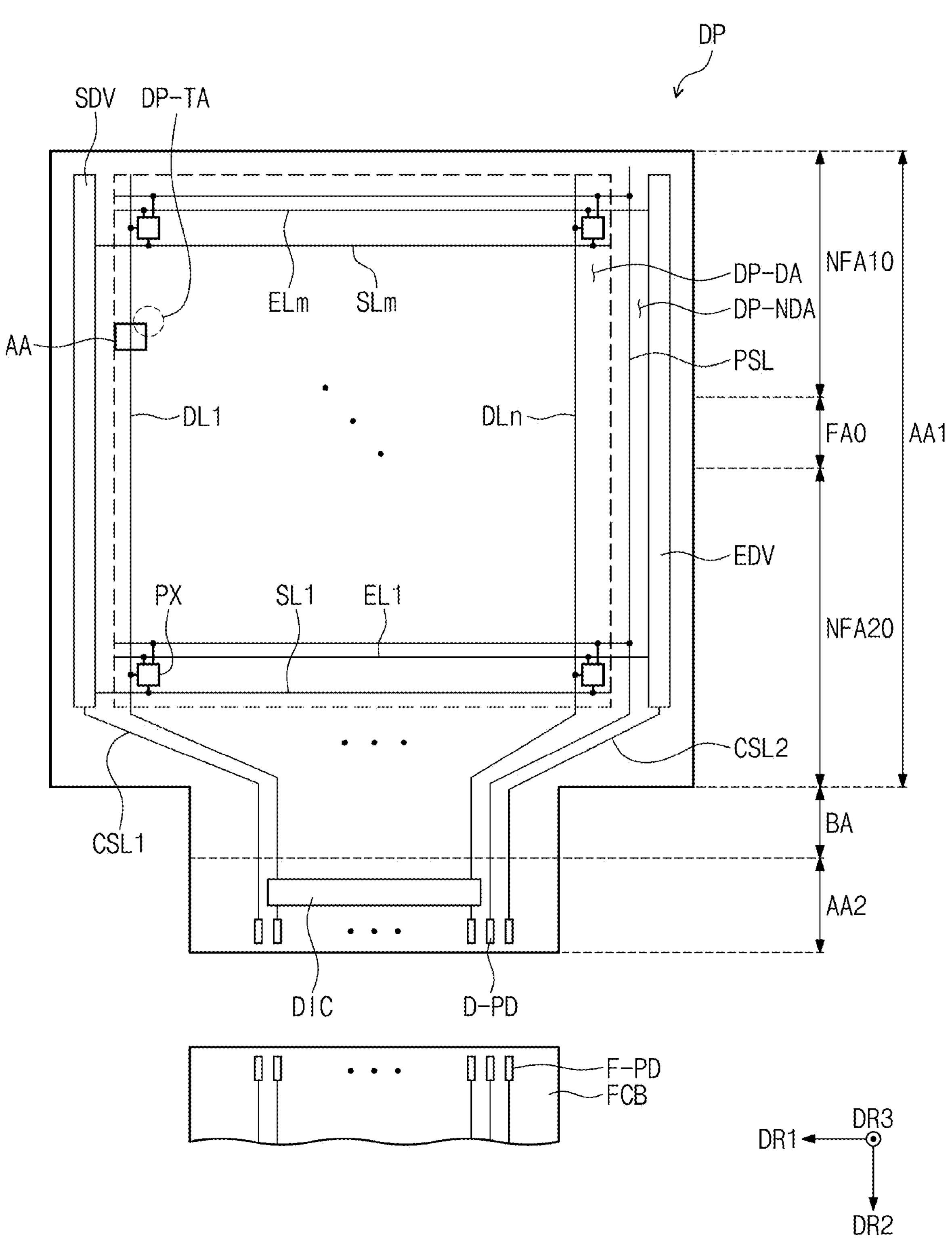
FIG. 3A is a plan view of a display panel according to an embodiment of the present disclosure.
Figure 3B:
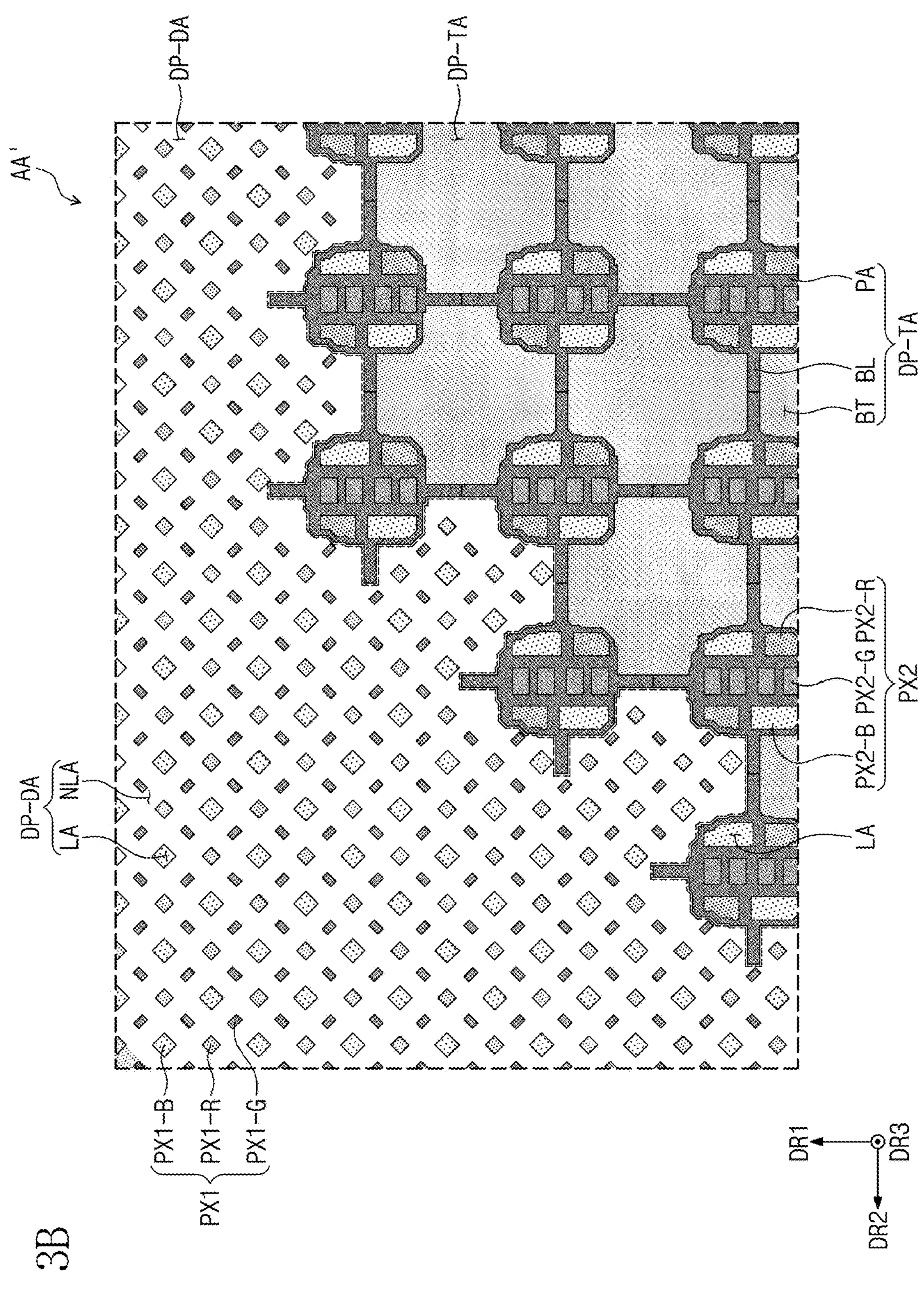
FIG. 3B is an enlarged plan view of area AA' of FIG. 3A.

FIG. 3A is a plan view of the display panel DP according to an embodiment of the present disclosure. FIG. 3B is an enlarged plan view of partial area AA of FIG. 3A.

Referring to FIG. 3A, the display panel DP may include the display area DP-DA and the non-display area DP-NDA disposed around the display area DP-DA. The display area DP-DA and the non-display area DP-NDA are distinguished from each other by the presence of a pixel PX. The pixel PX is disposed in the display area DP-DA. A scan driving unit SDV (e.g., a scan driver circuit), a data driving unit (e.g., a data driving circuit), and a light emitting driving unit EDV (e.g., an emitting driving circuit) may be arranged in the non-display area DP-NDA. The data driving unit may be a partial circuit included in the driving chip DIC illustrated in FIG. 3A.

The display panel DP includes a first non-bending area AA1, a second non-bending area AA2, and a bending area BA divided in the second direction DR2. The second non-bending area AA2 and the bending area BA may be partial areas of the non-display area DP-NDA. The bending area BA is disposed between the first non-bending area AA1 and the second non-bending area AA2.

The first non-bending area AA1 is an area that overlaps the display surface DS of FIG. 1A. The first non-bending area AA1 may include the first non-folding area NFA1, the second non-folding area NFA2, and the folding area FA. The first non-folding area NFA1, the second non-folding area NFA2, and the folding area FA respectively correspond to the first non-folding area NFA1, the second non-folding area NFA2, and the folding area FA illustrated in FIGS. 1A and 1B, respectively.

A width of the bending area BA and the second non-bending area AA2 in the first direction DR1 may be smaller than a width of the first non-bending area AA1. The bending area BA, which has a relatively short length in the first direction DR1, may be bent about the bending axis extending in the first direction DR1.

The display panel DP may include a plurality of pixels PX, a plurality of scan lines SL1 to SLm, a plurality of data lines DL1 to DLn, a plurality of light emitting lines EL1 to ELm, first and second control lines CSL1 and CSL2, a power line PSL, and a plurality of display pads D-PD. In this case, "m" and "n" are natural numbers. The pixels PX may be connected to the scan lines SL1 to SLm, the data lines DL1 to DLn, and the light emitting lines EL1 to ELm.

The scan lines SL1 to SLm may extend in the first direction DR1 and may be connected to the scan driving unit SDV. The data lines DL1 to DLn may extend in the second direction DR2 and may be connected to the driving chip DIC via the bending area BA. The light emitting lines EL1 to ELm may extend in the first direction DR1 and may be connected to the light emitting driving unit EDV.

The power line PSL may include a portion extending in the second direction DR2 and a portion extending in the first direction DR1. According to an embodiment, the portion extending in the first direction DR1 and the portion extending in the second direction DR2 are arranged in different layers. A portion of the power line PSL, which extends in the second direction DR2, may extend to the second non-bending area AA2 via the bending area BA. The power line PSL may provide a first voltage to the pixels PX.

The first control line CSL1 may be connected to the scan driving unit SDV and may extend toward a lower end of the second non-bending area AA2 via the bending area BA. The second control line CSL2 may be connected to the light emitting driving unit EDV and may extend toward the lower end of the second non-bending area AA2 via the bending area BA.

On a plane, the display pads D-PD may be arranged adjacent to the lower end of the second non-bending area AA2. The driving chip DIC, the power line PSL, the first control line CSL1, and the second control line CSL2 may be connected to the display pads D-PD. Substrate pads F-PD included in the flexible circuit board FCB may be electrically connected to the corresponding display pads D-PD through an anisotropic conductive adhesive layer.

Referring to FIG. 3B, the sensing area DP-TA of the electronic device ED (see FIG. 1A) according to an embodiment is an area having higher light transmittance within a reference area (or the same area) than that of the display area DP-DA. In an embodiment, the sensing area DP-TA has a smaller occupancy ratio of a light shielding structure within the reference area than that of the display area DP-DA. The light shielding structure may include a conductive pattern of a circuit layer, an electrode of a light emitting element and a light shielding pattern.

In an embodiment, the sensing area DP-TA has a lower resolution within the reference area than that of the display area DP-DA. For example, the sensing area DP-TA may have fewer pixels arranged within the reference area (or the same area) than that of the display area DP-DA.

As illustrated in FIG. 3B, a first pixel PX1 may be disposed in the display area DP-DA, and a second pixel PX2 may be disposed in the sensing area DP-TA. The first pixel PX1 and the second pixel PX2 may have different light emitting areas when comparing areas of pixels that provide the same color. The first pixel PX1 and the second pixel PX2 may have different arrangements.

FIG. 3B illustrates light emitting areas LA of the first pixel PX1 and the second pixel PX2 while the first pixel PX1 and the second pixel PX2 are represented. Each of the light emitting areas LA may be defined as an area in which an anode of the light emitting element is exposed from a pixel defining film. A non-light emitting area NLA is disposed between the light emitting areas LA inside the display area DP-DA.

The first pixel PX1 may include a first color pixel PX1-R, a second color pixel PX1-G, and a third color pixel PX1-B, and the second pixel PX2 may include a first color pixel PX2-R, a second color pixel PX2-G, and a third color pixel PX2-B. The first color pixel PX1-R and the first color pixel PX2-R may provide red lights, the second color pixel PX1-G and the second color pixel PX2-G may provide green lights, and the third color pixel PX1-B and the third color pixel PX2-B may provide blue lights.

The sensing area DP-TA may include a pixel area PA, a wiring line area BL, and a transmissive area BT. The second pixel PX2 is disposed inside the pixel area PA. It is illustrated that two first color pixels PX2-R, four second color pixels PX2-G, and two third color pixels PX2-B are arranged inside the one pixel area PA, but the present disclosure is not limited thereto.

A conductive pattern, a signal line, or a light shielding pattern related to the second pixel PX2 is disposed in the pixel area PA and the wiring line area BL. The light shielding pattern may be a metallic pattern and may substantially overlap the pixel area PA and the wiring line area BL. The pixel area PA and the wiring line area BL may be non-transmissive areas.

The transmissive area BT is an area through which an optical signal or an external light substantially passes. Since the second pixel PX2 is not disposed in the transmissive area BT, the conductive pattern, the signal line, or the light shielding pattern are arranged. Thus, the transmissive area BT increases the light transmittance of the sensing area DP-TA. According to an embodiment, the electro-optical module ELM described in FIG. 2A overlaps the sensing area DP-TA having a high light transmittance, thereby increasing optical signal reception efficiency.

However, the present disclosure is not limited thereto, and the sensing area DP-TA may be defined as a hole passing from a front surface to a rear surface of the display module DM. In this case, the hole may overlap the electro-optical module ELM (see FIG. 2B).

Figure 4:
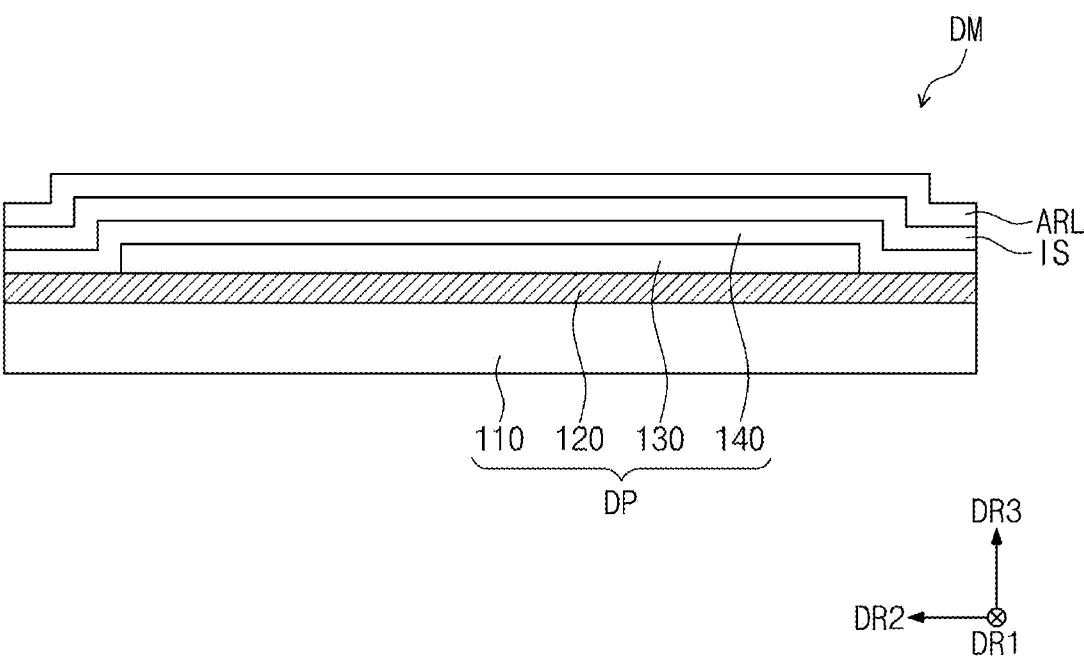
FIG. 4 is a cross-sectional view of a display module according to an embodiment of the present disclosure.

FIG. 4 is a cross-sectional view of a display module according to an embodiment of the present disclosure.

Referring to FIG. 4, the display module DM includes the display panel DP, the input sensor IS, and a reflection preventing layer ARL. The display panel DP includes a base layer 110, a circuit layer 120, a light emitting element layer 130, and an encapsulation layer 140.

The base layer 110 may provide a base surface on which the circuit layer 120 is disposed. The base layer 110 may be a flexible substrate that may be bent, folded, or rolled. The base layer 110 may be a glass substrate, a metal substrate or a polymer substrate. However, embodiments of the present disclosure are not limited thereto. For example, the base layer 110 may be an inorganic layer, an organic layer, or a composite material layer.

The base layer 110 may have a multi-layer structure. For example, the base layer 110 may include a first synthetic resin layer, an inorganic layer of a multi-layer structure or a single-layer structure, and a second synthetic resin layer disposed on the inorganic layer of the multi-layer structure or the single-layer structure. Each of the first and second synthetic resin layers may include a polyimide-based resin, but the present disclosure is not limited thereto.

The circuit layer 120 may be disposed on the base layer 110. The circuit layer 120 may include at least one of insulating layers, a semiconductor pattern, the conductive pattern and the signal line.

The light emitting element layer 130 may be disposed on the circuit layer 120. The light emitting element layer 130 may include a light emitting element. For example, the light emitting element may include an organic light emitting material, an inorganic light emitting material, an organic-inorganic light emitting material, a quantum dot, a quantum rod, a micro-light emitting diode (LED), or a nano-LED.

The encapsulation layer 140 may be disposed on the light emitting element layer 130. The encapsulation layer 140 may protect the light emitting element layer 130 from foreign substances such as moisture, oxygen, and dust particles. The encapsulation layer 140 may include at least one inorganic layer. The encapsulation layer 140 may include a laminated structure of an inorganic layer/organic layer/inorganic layer. The inorganic layers may protect the light emitting element layer 130 from moisture and oxygen, and the organic layer may protect the light emitting element layer 130 from foreign substances such as dust particles.

The input sensor IS may be directly disposed on the display panel DP. The display panel DP and the input sensor IS may be formed through a continuous process. Here, the aspect that the input sensor IS is directly disposed on the display panel DP may mean that no third component is disposed between the input sensor IS and the display panel DP. That is, no separate adhesive layer may be disposed between the input sensor IS and the display panel DP.

The reflection preventing layer ARL may be directly disposed on the input sensor IS. The reflection preventing layer ARL may reduce a reflectance of an external light input from the outside of the display device DD (see FIG. 1). The reflection preventing layer ARL may include color filters. The color filters may have a predetermined arrangement. For example, the color filters may be arranged in consideration of light emitting colors of the pixels included in the display panel DP. Further, the reflection preventing layer ARL may further include a black matrix adjacent to the color filters.

In an embodiment of the present disclosure, positions of the input sensor IS and the reflection preventing layer ARL may be changed to each other. In an embodiment of the present disclosure, the reflection preventing layer ARL may be replaced with a polarizing film. The polarizing film may be coupled to the input sensor IS through an adhesive layer.

Figure 5:
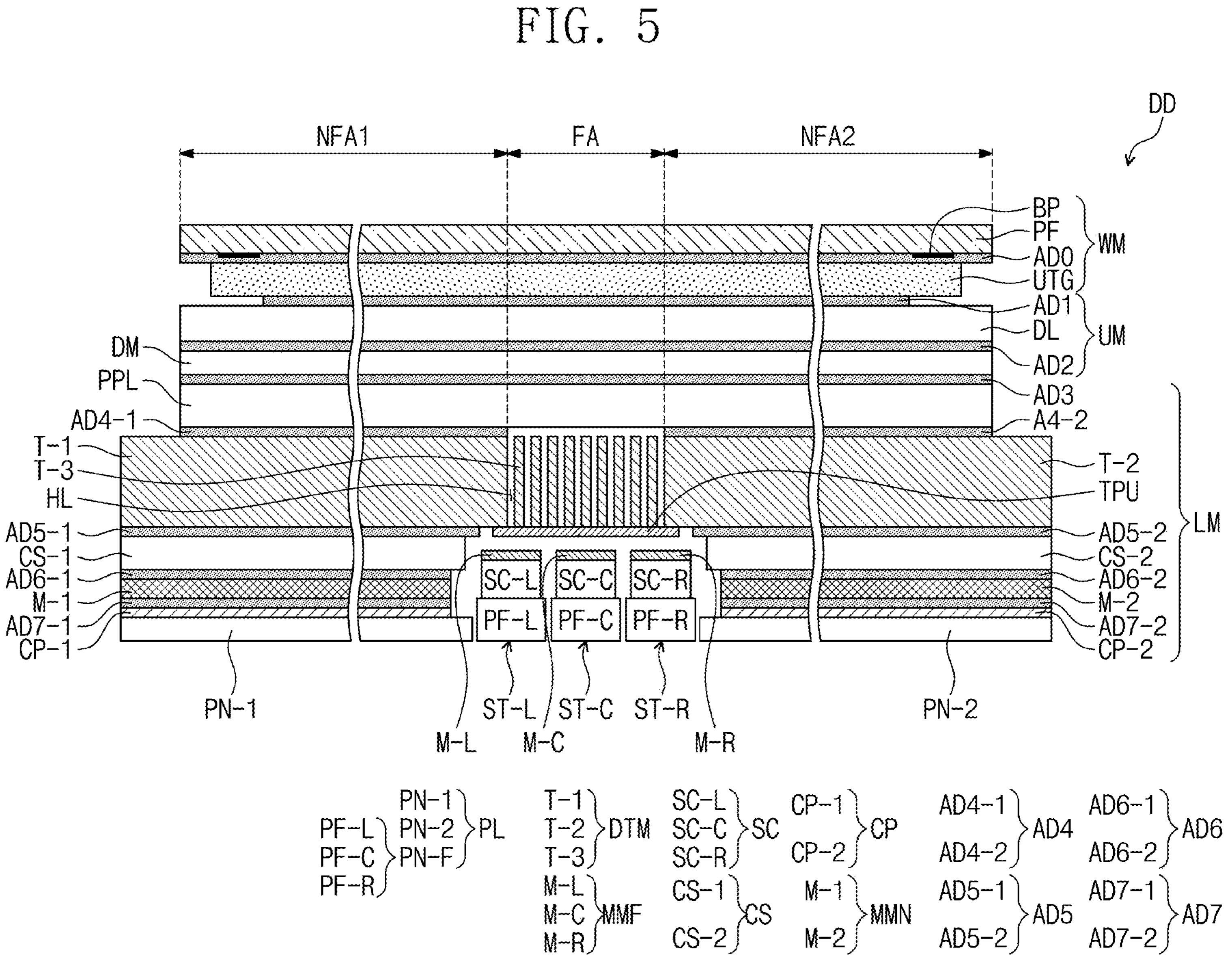
FIG. 5 is a cross-sectional view of the electronic device according to an embodiment of the present disclosure.
Figure 6:
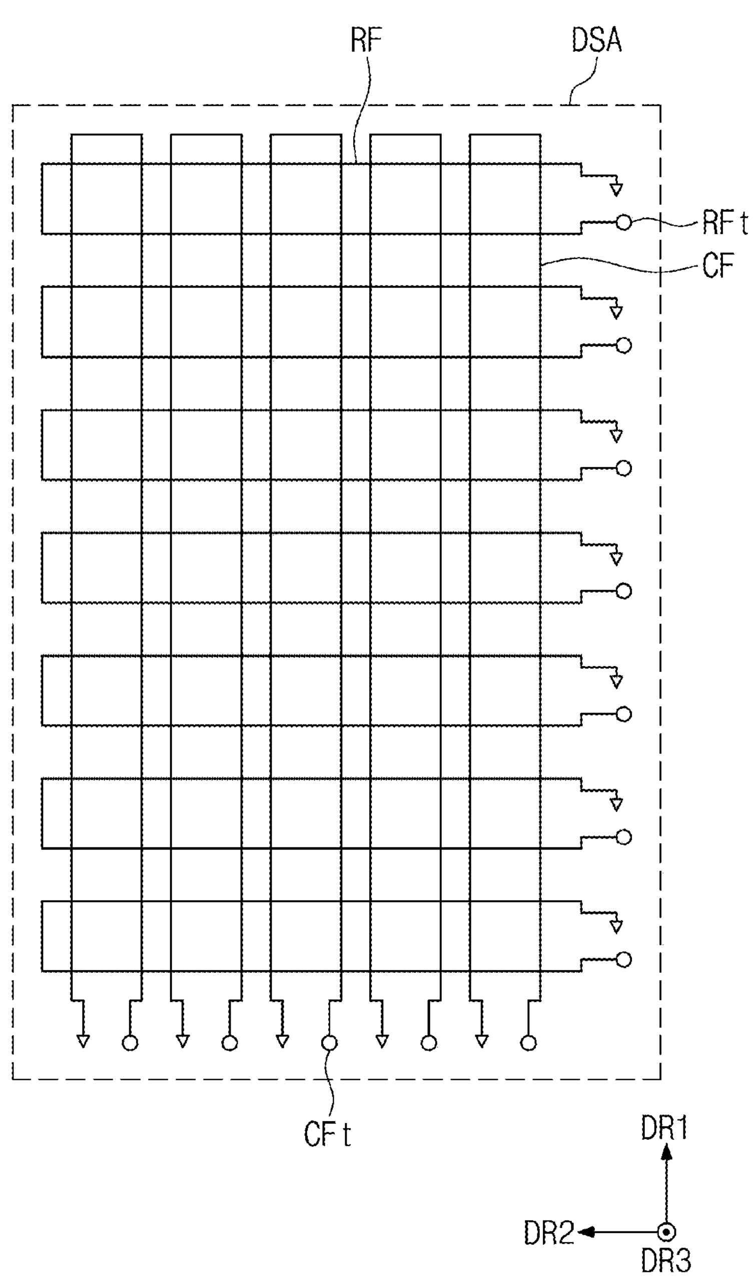
FIG. 6 is a plan view of a sensing area of a digitizer according to an embodiment of the present disclosure.
Figure 7:
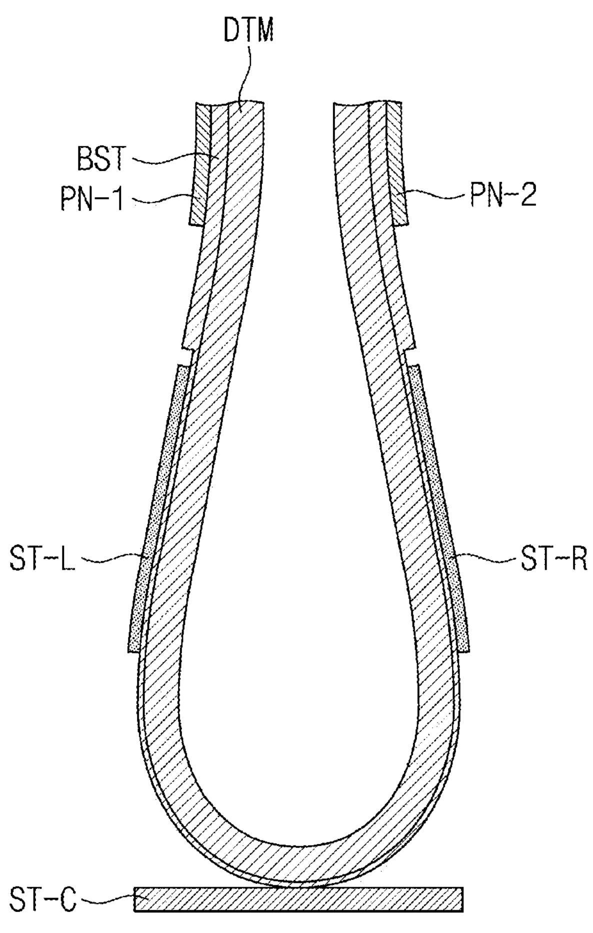
FIG. 7 is a cross-sectional view illustrating one area of the folded digitizer according to an embodiment of the present disclosure.

FIG. 5 is a cross-sectional view of the electronic device according to an embodiment of the present disclosure. FIG. 6 is a plan view of a sensing area of a digitizer according to an embodiment of the present disclosure. FIG. 7 is a cross-sectional view illustrating one area of the folded digitizer according to an embodiment of the present disclosure.

Referring to FIG. 5, the display device DD includes the window WM, an upper member UM, the display module DM, a lower member LM, and a plate PL. The upper member UM is may be referred to as a component disposed between the window WM and the display module DM, and the lower member LM may be referred to as a component disposed under the display module DM. Some components of the lower member LM may be coupled to the plate PL.

In an embodiment, the window WM includes a thin film glass substrate UTG, a window protecting layer PF disposed on the thin film glass substrate UTG, and a bezel pattern BP disposed on a lower surface of the window protecting layer PF. In an embodiment, the window protecting layer PF includes a synthetic resin film.

The bezel pattern BP may be disposed on one surface of the thin film glass substrate UTG or one surface of the window protecting layer PF. An example in which the bezel pattern BP is disposed on the lower surface of the window protecting layer PF is illustrated in FIG. 5. However, the present disclosure is not limited thereto. For example, the bezel pattern BP may be disposed on an upper surface of the window protecting layer PF. The bezel pattern BP, which is a colored light shielding film, may be formed by, for example, a coating method. The bezel pattern BP may include a base material and a dye or pigment mixed with the base material. The non-display area NDA illustrated in FIG. 1A may be defined by a shape of the bezel pattern BP.

A thickness of the thin film glass substrate UTG may be in a range of 15 μm to 45 μm. The thin film glass substrate UTG may be made of a chemically strengthened glass. Even when the thin film glass substrate UTG is repeatedly folded and unfolded, occurrence of wrinkles may be minimized.

A thickness of the window protecting layer PF may be in a range of 50 μm to 80 μm. A synthetic resin film of the window protecting layer PF may include polyimide, polycarbonate, polyamide, triacetylcellulose, polymethylmethacrylate, or polyethylene terephthalate. At least one of a hard coating layer, a fingerprint preventing layer, and a reflection preventing layer may be disposed on the upper surface of the window protecting layer PF.

The window protecting layer PF and the thin film glass substrate UTG may be coupled to each other by a window-adhesive layer AD0. The window-adhesive layer AD0 may include at least one of an optical clear adhesive (OCA), an optical clear resin (OCR), and a pressure sensitive adhesive (PSA). Adhesive layers, which will be described below, may also include the same material as that of the window-adhesive layer AD0.

The window-adhesive layer AD0 may be separated from the thin film glass substrate UTG. That is, an adhesive force between the window-adhesive layer AD0 and the thin film glass substrate UTG may be smaller than an adhesive force between the window-adhesive layer AD0 and the window protecting layer PF. When the window protecting layer PF is disposed on an upper side, scratches may occur relatively easily as compared to the thin film glass substrate UTG. After the window-adhesive layer AD0 and the window protecting layer PF are separated from each other, a new window protecting layer PF may be attached to the thin film glass substrate UTG.

According to an embodiment, on a plane, an edge of the thin film glass substrate UTG may not overlap the bezel pattern BP. By inspecting an edge of the thin film glass substrate UTG, which is exposed from the bezel pattern BP, fine cracks occurring on the edge of the thin film glass substrate UTG may be observed.

The upper member UM includes an upper film DL and first and second adhesive layers AD1 and AD2 between which the upper film DL is disposed. The upper film DL may include a synthetic resin film. The synthetic resin film may include polyimide, polycarbonate, polyamide, triacetylcellulose, polymethylmethacrylate, or polyethylene terephthalate.

The upper film DL may absorb an external impact applied to a front surface of the display device DD. The display module DM described with reference to FIG. 4 may include the reflection preventing layer ARL that replaces the polarizing film, and accordingly, a front impact strength of the display device DD may be reduced. The upper film DL may compensate for a reduced impact strength by applying the reflection preventing layer ARL. In an embodiment of the present disclosure, the upper film DL is omitted. The thin film glass substrate UTG and the upper film DL may be coupled to each other by the first adhesive layer AD1. The upper film DL and the display module DM may be coupled to each other by the second adhesive layer AD2.

In an embodiment, the lower member LM includes a panel protecting layer PPL, the digitizer DTM, a cushion layer CS, a shielding layer MMN, and a heat dissipating layer CP. Components of the lower member LM except for the digitizer DTM may be defined as functional layers.

The panel protecting layer PPL may be disposed under the display module DM. The panel protecting layer PPL may protect a lower portion of the display module DM. The panel protecting layer PPL may include a flexible synthetic resin film. For example, the panel protecting layer PPL may include polyethylene terephthalate. In an embodiment, the panel protecting layer PPL is not disposed in the bending area BA (see FIG. 3A). The panel protecting layer PPL and the display module DM may be coupled to each other by a third adhesive layer AD3.

According to an embodiment, the lower member LM further includes a barrier layer disposed between the panel protecting layer PPL and the digitizer DTM. The barrier layer may be coupled to the panel protecting layer PPL and the digitizer DTM through adhesive layers.

The barrier layer may increase resistance against a compressive force caused by external pressure. Thus, the barrier layer may serve to prevent deformation of the display module DM. The barrier layer may include a flexible plastic material such as polyimide or polyethylene terephthalate. Further, the barrier layer may be a colored film having low light transmittance.

The barrier layer may absorb light input from the outside. For example, the barrier layer may be a black synthetic resin film. When the display device DD is viewed from an upper side of the window protecting layer PF, components arranged under the barrier layer may not be visually recognized by the user.

The digitizer DTM may be disposed under the panel protecting layer PPL. The digitizer DTM according to the present disclosure may sense input by an electromagnetic pen (or stylus). In this case, the digitizer DTM may sense the input by the electromagnetic pen in a manner using electromagnetic resonance (EMR).

In an embodiment, the digitizer DTM includes a first non-folding part T-1 overlapping the first non-folding area NFA1, a folding part T-3 overlapping the folding area FA, and a second non-folding part T-2 overlapping the second non-folding area NFA2. In an embodiment, the first non-folding part T-1, the second non-folding part T-2, and the folding part T-3 of the digitizer DTM is a single mutually connected component. Thus, the digitizer DTM according to an embodiment may be an integrated digitizer DTM.

A plurality of holes HL may be defined in the folding part T-3 according to the present disclosure. The holes HL may be formed to pass from a front surface to a rear surface of the folding part T-3. For example, the holes HL may be through-holes. According to an embodiment, which the holes HL are defined in the folding part T-3, folding characteristics of the display device DD may be increased. For example, it may be easier to fold the display device DD due to the holes HL.

Referring to FIG. 6, the digitizer DTM according to an embodiment includes first sensing coils CF and second sensing coils RF. The first sensing coils CF may be referred to as driving coils, and the second sensing coils RF may be referred to as sensing coils, but the present disclosure is not limited thereto. For example, the first sensing coils CF may be referred to as sensing coils, and the second sensing coils RF may be referred to as driving coils.

Each of the first sensing coils CF may include long-side coils and short-side coils. Each of the long-side coils may extend in the first direction DR1, and the long-side coils may be spaced apart from each other in the second direction DR2. The short-side coil may be connected to an end of each of the long-side coils forming one loop to connect the long-side coils spaced apart from each other.

Although FIG. 6 illustrates each of the first sensing coils CF as one loop, each of the first sensing coils CF may substantially be a loop coil that is wound two or more times. In this case, parts that overlap each other on a plane may be arranged in different layers and connected through contact holes defined in the base layer 110.

Further, FIG. 6 illustrates that the first sensing coils CF each forming the one loop are spaced apart from each other, but the present disclosure is not limited thereto, and the long-side coils included in adjacent coils among the first sensing coils CF according to an embodiment may be alternately arranged.

Each of the second sensing coils RF may include long-side coils and short-side coils. Each of the long-side coils may extend in the second direction DR2, and the long-side coils may be spaced apart from each other in the first direction DR1. The short-side coil may be connected to an end of each of the long-side coils forming one loop to connect the long-side coils spaced apart from each other.

Although FIG. 6 illustrates each of the second sensing coils RF as one loop, each of the second sensing coils RF may substantially be a loop coil that is wound two or more times. In this case, parts that overlap each other on a plane may be arranged in different layers and connected through contact holes defined in the base layer 110.

FIG. 6 illustrates that the second sensing coils RF each forming the one loop are spaced apart from each other, but the present disclosure is not limited thereto, and the long-side coils included in adjacent coils among the second sensing coils RF according to an embodiment may be alternately arranged.

Alternating current (AC) signals may be sequentially provided to first terminals CFt of the of first sensing coils CF. The first terminals CFt and another one terminal of the first sensing coils CF may be grounded. Signal lines may be connected to the first terminals CFt of the first sensing coils CF, respectively.

When a current flows through the first sensing coils CF, a magnetic force line may be induced between the first sensing coils CF and the second sensing coils RF. The second sensing coils RF may sense an induced electromagnetic force emitted from the stylus pen and output the induced electromagnetic force as a sensing signal to second terminals RFt of the second sensing coils RF. The second terminals RFt and another one terminal of the second sensing coils RF may be grounded. Signal lines may be connected to the second terminals RFt of the second sensing coils RF, respectively.

According to the present disclosure, in the digitizer DTM described in FIG. 3, the sensing coils CF and RF are arranged in different shapes even in the folding part T-3 of the digitizer DTM, so that input by a stylus pen may be sensed.

Referring back to FIG. 5, the panel protecting layer PPL and the digitizer DTM are coupled to each other by a fourth adhesive layer AD4. In an embodiment, the fourth adhesive layer AD4 includes a first part AD4-1 overlapping the first non-folding area NFA1 and disposed between the panel protecting layer PPL and the first non-folding part T-1 and a second part AD4-2 spaced apart from the first part AD4-1 with the folding area FA interposed therebetween, overlapping the second non-folding area NFA2, and disposed between the panel protecting layer PPL and the second non-folding part T-2. For example, the folding area FA interposed between the first part AD4-1 and the second part AD4-2. For example, an upper surface of the digitizer DTM may be exposed by space between the first non-folding part T-1 and the second part AD4-2.

In an embodiment, the cushion layer CS is disposed under the digitizer DTM. The cushion layer CS may protect the display module DM and the digitizer DTM from an impact transmitted from a lower portion of the digitizer DTM. Further, the cushion layer CS may protect the display module DM and the digitizer DTM from an impact transmitted from the window WM.

The cushion layer CS may include foam or sponge. The foam may include polyurethane foam or thermoplastic polyurethane foam. When the cushion layer CS includes the foam, a barrier film as a base layer may be added to the cushion layer CS, and the cushion layer CS may be created by applying a foaming agent onto the barrier film. A thickness of the cushion layer CS according to an embodiment may be in a range of 60 μm to 200 μm.

In an embodiment, the cushion layer CS includes a first cushion layer CS-1 and a second cushion layer CS-2. The first cushion layer CS-1 may overlap the first non-folding part T-1. The second cushion layer CS-2 may overlap the second non-folding part T-2. In an embodiment, the first cushion layer CS-1 and the second cushion layer CS-2 are spaced apart from each other with the folding area FA interposed therebetween.

When the electronic device ED is folded, the first cushion layer CS-1 and the second cushion layer CS-2 may prevent foreign substances from being introduced into the holes HL defined in the folding part T-3. Further, when the electronic device ED is folded, even when the folding part T-3 is folded with a predetermined curvature, the first cushion layer CS-1 and the second cushion layer CS-2 are spaced apart from each other in an area overlapping the folding part T-3, and thus a shape of the digitizer DTM may be more easily changed. Accordingly, the electronic device ED having increased folding characteristics may be provided.

Even when the electronic device according to the present disclosure includes an integral digitizer DTM, the electronic device ED includes the cushion layer CS disposed under the digitizer DTM, and thus impact resistance of the electronic device ED may be increased.

The cushion layer CS and the digitizer DTM are coupled to each other by a fifth adhesive layer AD5. In an embodiment, the fifth adhesive layer AD5 includes a first part AD5-1 overlapping the first non-folding area NFA1 and disposed between the first cushion layer CS-1 and the first non-folding part T-1 and a second part AD5-2 spaced apart from the first part AD5-1 with the folding area FA interposed therebetween, overlapping the second non-folding area NFA2, and disposed between the second cushion layer CS-2 and the second non-folding part T-2. For example, the folding area FA may be interposed between the first cushion layer CS-1 and the second cushion layer CS-2.

The lower member LM according to an embodiment further includes a cover pattern TPU. The cover pattern TPU may be disposed between the first part AD5-1 and the second part AD5-2. For example, the cover pattern TPU may be disposed in space between the first part AD5-1 and the second part AD5-2. The cover pattern TPU may cover the holes HL of the folding part T-3. The cover pattern TPU may prevent dust, foreign substances, or the like from being introduced between the holes HL. The cover pattern TPU according to an embodiment includes a material having elasticity. For example, the cover pattern TPU may include thermoplastic polyurethane, rubber, or silicone, but the present disclosure is not limited thereto.

In an embodiment, the shielding layer MMN is disposed under the cushion layer CS. The shielding layer MMN may have an electromagnetic shielding function. The shielding layer MMN may block a magnetic field generated from components arranged under the digitizer DTM. Accordingly, sensing sensitivity of the digitizer DTM may be increased. The shielding layer MMN according to an embodiment includes magnetic metal powder MMP. The magnetic metal powder MMP may include very fine particles of metals that exhibit magnetic properties.

In an embodiment, the shielding layer MMN includes a first shielding layer M-1 and a second shielding layer M-2. The first shielding layer M-1 may overlap the first non-folding part T-1. The second shielding layer M-2 may overlap the second non-folding part T-2. In an embodiment, the first shielding layer M-1 and the second shielding layer M-2 are be spaced apart from each other with the folding area FA interposed therebetween.

The shielding layer MMN and the cushion layer CS are coupled to each other by a sixth adhesive layer AD6. In an embodiment, the sixth adhesive layer AD6 includes a first part AD6-1 overlapping the first non-folding area NFA1 and disposed between the first shielding layer M-1 and the first cushion layer CS-1 and a second part AD6-2 spaced apart from the first part AD6-1 with the folding area FA interposed therebetween, overlapping the second non-folding area NFA2, and disposed between the second shielding layer M-2 and the second cushion layer CS-2.

When the electronic device ED is folded, even when the folding part T-3 is folded with a predetermined curvature, the first shielding layer M-1 and the second shielding layer M-2 are spaced apart from each other in an area overlapping the folding part T-3, and thus the shape of the digitizer DTM may be more easily changed. Accordingly, the electronic device ED having increased folding characteristics may be provided. Further, the cushion layer CS is disposed on the shielding layer MMN, and thus the electronic device ED having increased impact resistance may be provided.

In an embodiment, the heat dissipating layer CP is disposed under the shielding layer MMN. The heat dissipating layer CP emits heat generated from electronic components arranged under the heat dissipating layer CP. The electronic components may be any one of the electronic modules EM illustrated in FIGS. 2A and 2B. Thus, heat generated from the electronic components may not be transferred to the digitizer DTM and the display module DM. Accordingly, the electronic device ED having increased reliability may be provided.

The heat dissipating layer CP according to an embodiment may be provided as a base layer containing polyethylene terephthalate and a sheet disposed on the base layer and containing copper. However, the present disclosure is not limited thereto. For example, the heat dissipating layer CP may have a structure in which an adhesive layer and a graphite layer are alternately laminated, but the present disclosure is not limited thereto.

In an embodiment, the heat dissipating layer CP includes a first heat dissipating layer CP-1 and a second heat dissipating layer CP-2. The first heat dissipating layer CP-1 may overlap the first non-folding part T-1. The second heat dissipating layer CP-2 may overlap the second non-folding part T-2. In an embodiment, the first heat dissipating layer CP-1 and the second heat dissipating layer CP-2 are spaced apart from each other with the folding area FA interposed therebetween.

In an embodiment, the plate PL is disposed under the heat dissipating layer CP. The plate PL may be coupled to components arranged on the plate PL and function to maintain the shapes of the display module DM and the digitizer DTM and protect the display module DM and the digitizer DTM from an external impact during folding and unfolding operations. The plate PL may be coupled to the housing HM (see FIG. 2A) with an adhesive layer. The plate PL may contain a material having high rigidity, such as metal or plastic.

In an embodiment, the plate PL includes a first support part PN-1, a second support part PN-2, and a folding support part PN-F. The first support part PN-1 may overlap the first non-folding part T-1. The second support part PN-2 may overlap the second non-folding part T-2. In an embodiment, the first support part PN-1 and the second support part PN-2 are spaced apart from each other with the folding support part PN-F interposed therebetween. The folding support part PN-F may be disposed in the space between the first support part PN-1 and the second support part PN-2.

The first support part PN-1 and the second support part PN-2 are coupled to the heat dissipating layer CP by a seventh adhesive layer AD7. In an embodiment, the seventh adhesive layer AD7 includes a first part AD7-1 overlapping the first non-folding area NFA1 and disposed between the first support part PN-1 and the first heat dissipating layer CP-1 and a second part AD7-2 spaced apart from the first part AD7-1 with the folding area FA interposed therebetween, overlapping the second non-folding area NFA2, and disposed between the second support part PN-2 and the second heat dissipating layer CP-2.

In an embodiment, the folding support part PN-F includes a first folding support portion PF-L (e.g., left folding support), a second folding support portion PF-R (e.g., a right folding support), and a center support portion PF-C. The first folding support portion PF-L, the second folding support portion PF-R, and the center support portion PF-C may be spaced apart from each other within the folding area FA.

The electronic device ED according to the present disclosure further includes a step compensating layer SC for compensating for a step between components overlapping the first and second non-folding areas NFA1 and NFA2 and arranged under the digitizer DTM and a lower portion of the folding area FA. The step compensating layer SC may be a double-sided tape or an insulating film. In an embodiment, the step compensating layer SC includes a first step compensating layer SC-L (e.g., a left step compensating layer), a second step compensating layer SC-R (e.g., a right step compensating layer), and a center step compensating layer SC-C.

According to an embodiment, the step compensating layer SC is disposed on the folding support part PN-F. In more detail, the first step compensating layer SC-L may be disposed on the first folding support portion PF-L. An adhesive layer may be disposed between the first step compensating layer SC-L and the first folding support portion PF-L. The second step compensating layer SC-R may be disposed on the second folding support portion PF-R. An adhesive layer may be disposed between the second step compensating layer SC-R and the second folding support portion PF-R. The center step compensating layer SC-C may be disposed on the first folding support portion PF-L. An adhesive layer may be disposed between the first step compensating layer SC-L and the first folding support portion PF-L.

The electronic device ED according to the present disclosure further includes a folding shielding layer MMF disposed below the folding area FA and disposed on the step compensating layer SC. The folding shielding layer MMF may have an electromagnetic shielding function. Accordingly, sensing sensitivity of the digitizer DTM in the folding area FA may be increased. The folding shielding layer MMF may include magnetic metal powder MMP. In an embodiment, the folding shielding layer MMF includes a first folding shielding layer M-L (e.g., a left shielding layer), a second folding shielding layer M-R (e.g., a right shielding layer), and a center folding shielding layer M-C.

According to an embodiment, the first folding shielding layer M-L is disposed on the first step compensating layer SC-L. An adhesive layer may be disposed between the first folding shielding layer M-L and the first step compensating layer SC-L. The second folding shielding layer M-R may be disposed on the second step compensating layer SC-R. An adhesive layer may be disposed between the second folding shielding layer M-R and the second step compensating layer SC-R. The center folding shielding layer M-C may be disposed on the center step compensating layer SC-C. An adhesive layer may be disposed between the center folding shielding layer M-C and the center step compensating layer SC-C.

Referring to FIGS. 5 and 7, the first step compensating layer SC-L, the first folding support portion PF-L, and the first folding shielding layer M-L that are sequentially laminated may be defined as a first folding structure ST-L. The second step compensating layer SC-R, the second folding support portion PF-R, and the second folding shielding layer M-R may be defined as a second folding structure ST-R. The second step compensating layer SC-R, the second folding support portion PF-R, and the second folding shielding layer M-R may be sequentially laminated to form the second folding structure ST-R. The center step compensating layer SC-C, the center support portion PF-C, and the center folding shielding layer M-C may be defined as a center folding structure ST-C.

Further, the components AD5 to AD7 arranged between a first digitizer T-1 and the first support part PN-1 and between a second digitizer T-2 and the second support part PN-2 may be defined as a lower structure BST (see FIG. 7).

FIG. 7 schematically illustrates a relationship between the digitizer DTM and the folding structures ST-L, ST-R, and ST-C and a relationship between the first support part PN-1 and the second support part PN-2 in a state in which the digitizer DTM is folded.

In a state in which the digitizer DTM is folded, the center folding structure ST-C may be attached to the housing HM (see FIG. 2A). Unlike this, the first folding structure ST-L may be disposed in a portion of the folding part T-3, which is relatively flat, to protect/shield/dissipate the portion of the folding part T-3, and the second folding structure ST-R may be disposed in another portion of the folding part T-3, which is relatively flat, to protect/shield/dissipate another portion of the folding part T-3.

Further, the first support part PN-1 may be attached to the first digitizer T-1 among the digitizer DTM to protect/shield/dissipate the first digitizer T-1, and the second support part PN-2 may be attached to the second digitizer T-2 to protect/shield/dissipate the second digitizer T-2.

According to the present disclosure, the plate PL disposed under the digitizer DTM is individually attached to each area of the digitizer DTM, and thus even when a folding operation is repeated, each area may be protected/shielded/dissipated. Accordingly, the electronic device ED having increased reliability may be provided.

Figure 8:
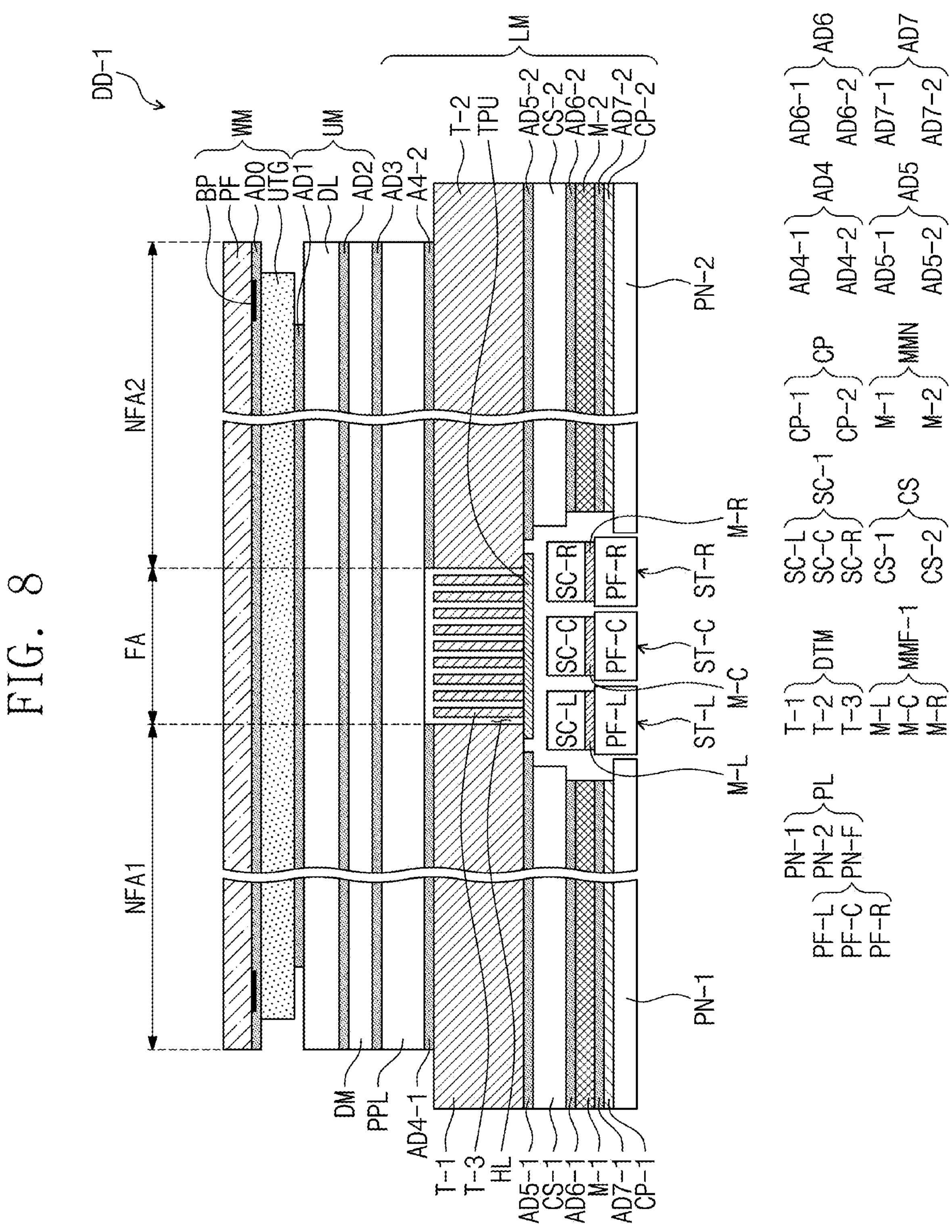
FIG. 8 is a cross-sectional view of the electronic device according to an embodiment of the present disclosure.

FIG. 8 is a cross-sectional view of the electronic device according to an embodiment of the present disclosure. In FIG. 8, the same/similar reference numerals are used for the same/similar components described in FIGS. 5 to 7, and a duplicated description thereof will be omitted.

Referring to FIG. 8, a display device DD-1 according to an embodiment includes the window WM, the upper member UM, the display module DM, the lower member LM, and the plate PL. Descriptions of the window WM, the upper member UM, the display module DM, and the plate PL may be the same as those of the components described in FIG. 7. A difference between the lower member LM described in FIG. 7 and the lower member LM described below will be mainly described.

The folding support part PN-F may include the first folding support portion PF-L, the second folding support portion PF-R, and the center support portion PF-C. The first folding support portion PF-L, the second folding support portion PF-R, and the center support portion PF-C may be spaced apart from each other within the folding area FA.

The display device DD-1 according to an embodiment may further include a folding shielding layer MMF-1 disposed under the folding area FA and disposed on the folding support part PN-F. In an embodiment, the folding shielding layer MMF-1 has an electromagnetic shielding function. Accordingly, sensing sensitivity of the digitizer DTM in the folding area FA may be increased. The folding shielding layer MMF-1 may include magnetic metal powder MMP. The folding shielding layer MMF-1 may include the first folding shielding layer M-L, the second folding shielding layer M-R, and the center folding shielding layer M-C.

According to an embodiment, the folding shielding layer MMF-1 is disposed on the folding support part PN-F. In more detail, the first folding shielding layer M-L may be disposed on the first folding support portion PF-L. An adhesive layer may be disposed between the first folding shielding layer M-L and the first folding support portion PF-L. The second step compensating layer SC-R may be disposed on the second folding support portion PF-R. An adhesive layer may be disposed between the second folding shielding layer M-R and the second folding support portion PF-R. The center folding shielding layer M-C may be disposed on the center folding support portion PF-C. An adhesive layer may be disposed between the first step compensating layer SC-L and the center folding support portion PF-C.

The display device DD-1 according to an embodiment may further include a step compensating layer SC-1 for compensating for the step between the components overlapping the first and second non-folding areas NFA1 and NFA2 and arranged under the digitizer DTM and the lower portion of the folding area FA. The step compensating layer SC-1 may be a double-sided tape or an insulating film. The step compensating layer SC-1 may include the first step compensating layer SC-L, the second step compensating layer SC-R, and the center step compensating layer SC-C. In an embodiment, the step compensating layer SC-1 is spaced apart from the cover pattern TPU.

According to an embodiment, the first step compensating layer SC-L is disposed on the first folding shielding layer M-L. An adhesive layer may be disposed between the first step compensating layer SC-L and the first folding shielding layer M-L. The second step compensating layer SC-R may be disposed on the second folding shielding layer M-R. An adhesive layer may be disposed between the second step compensating layer SC-R and the second folding shielding layer M-R. The center step compensating layer SC-C may be disposed on the center folding shielding layer M-C. An adhesive layer may be disposed between the center step compensating layer SC-C and the center folding shielding layer M-C.

Figure 9:
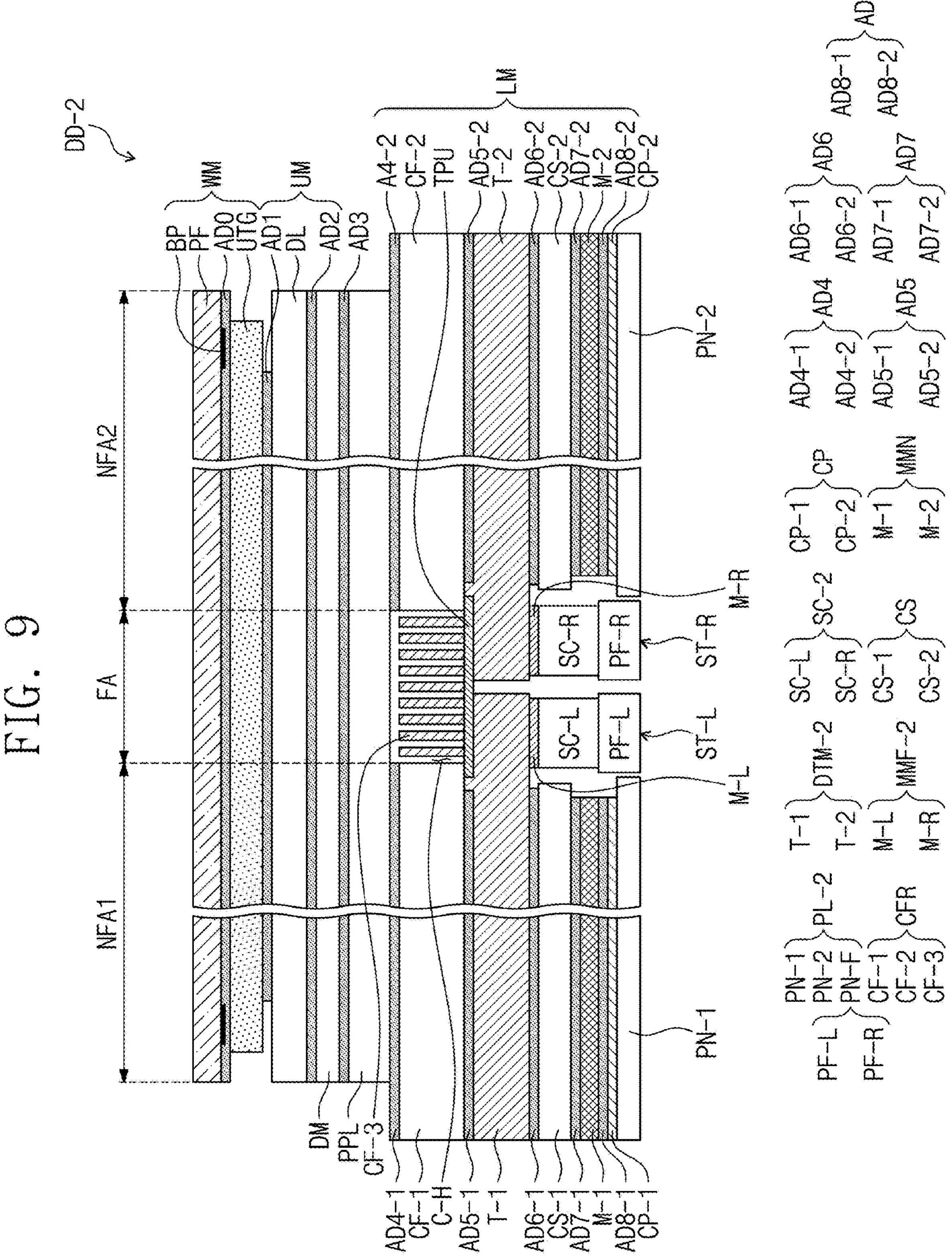
FIG. 9 is a cross-sectional view of the electronic device according to an embodiment of the present disclosure.

FIG. 9 is a cross-sectional view of the electronic device according to an embodiment of the present disclosure. In FIG. 9, the same/similar reference numerals are used for the same/similar components described in FIGS. 5 to 7, and a duplicated description thereof will be omitted.

Referring to FIG. 9, a display device DD-2 according to an embodiment includes the window WM, the upper member UM, the display module DM, the lower member LM, and a plate PL-2. Descriptions of the window WM, the upper member UM, and the display module DM may be the same as those of the components described in FIG. 7. A difference between the lower member LM described in FIG. 7 and the lower member LM described below will be mainly described.

In an embodiment, the lower member LM includes an upper plate CFR, the cover pattern TPU, a digitizer DTM-2, the cushion layer CS, the shielding layer MMN, the heat dissipating layer CP, the plate PL-2, the first folding structure ST-L, and the second folding structure ST-R. In an embodiment, the folding shielding layer MMF-2 is spaced apart from the cover pattern TPU.

The digitizer DTM-2 according to an embodiment senses input by a stylus pen. The digitizer DTM-2 may sense an external input in the EMR manner. The digitizer DTM-2 may be disposed under the display module DM.

In an embodiment, the digitizer DTM-2 includes the first digitizer T-1 and the second digitizer T-2 spaced apart from each other in the folding area FA. Unlike the integrated digitizer DTM of FIG. 5, the digitizer DTM-2 according to an embodiment may be a separate digitizer DTM-2 that is individually driven. Accordingly, the first digitizer T-1 and the second digitizer T-2 may be spaced apart from each other and connected to each other through a flexible circuit board. The first digitizer T-1 may overlap the first non-folding area NFA1 and a portion of the folding area FA, and the second digitizer T-2 may overlap the second non-folding area NFA2 and another portion of the folding area FA.

The upper plate CFR may be disposed on the digitizer DTM-2. In an embodiment, the upper plate CFR includes a first plate CF-1 overlapping the first non-folding area NFA1, a second plate CF-2 overlapping the second non-folding area NFA2, and a third plate CF-3 overlapping the folding area FA and disposed between the first plate CF-1 and the second plate CF-2.

In an embodiment, for convenience of description, the first plate CF-1, the second plate CF-2, and the third plate CF-3 are described separately, but the first plate CF-1, the second plate CF-2, and the third plate CF-3 may be provided as a single body. The upper plate CFR may be carbon fiber reinforced plastic (CFRP) or glass fiber reinforced plastic (GFRP). In an embodiment, the upper plate CFR may function as a protection member that protects the display module DM.

The upper plate CFR and the panel protecting layer PPL may be coupled to each other by the fourth adhesive layer AD4. The fourth adhesive layer AD4 may include the first part AD4-1 overlapping the first non-folding area NFA1 and disposed on the first plate CF-1 and the second part AD4-2 spaced apart from the first part AD4-1 with the folding area FA interposed therebetween and disposed on the second plate CF-2.

The upper plate CFR and the digitizer DTM-2 are coupled to each other by the fifth adhesive layer AD5. The fifth adhesive layer AD5 may include the first part AD5-1 overlapping the first non-folding area NFA1 and disposed between the first digitizer T-1 and the first plate CF-1 and the second part AD5-2 spaced apart from the first part AD5-1 with the folding area FA interposed therebetween and disposed between the second digitizer T-2 and the second plate CF-2.

The lower member LM according to an embodiment further includes the cover pattern TPU. In an embodiment, the cover pattern TPU is disposed between the first part AD5-1 and the second part AD5-2. The cover pattern TPU may cover holes C-H (e.g., through-holes) of the third plate CF-3. The cover pattern TPU may prevent dust, foreign substances, or the like from being introduced between the holes C-H. The cover pattern TPU according to an embodiment includes a material having elasticity. For example, the cover pattern TPU may include thermoplastic polyurethane, rubber, or silicone, but the present disclosure is not limited thereto.

In an embodiment, the cushion layer CS is disposed under the digitizer DTM-2. In an embodiment, the cushion layer CS includes the first cushion layer CS-1 and the second cushion layer CS-2. The first cushion layer CS-1 may overlap the first digitizer T-1. The second cushion layer CS-2 may overlap the second digitizer T-2. In an embodiment, the first cushion layer CS-1 and the second cushion layer CS-2 is spaced apart from each other with the folding area FA interposed therebetween.

The digitizer DTM-2 and the cushion layer CS are coupled to each other by the sixth adhesive layer AD6. In an embodiment, the sixth adhesive layer AD6 includes the first part AD6-1 overlapping the first non-folding area NFA1 and disposed between the first digitizer T-1 and the first cushion layer CS-1 and the second part AD6-2 spaced apart from the first part AD6-1 with the folding area FA interposed therebetween and disposed between the second digitizer T-2 and the second cushion layer CS-2.

In an embodiment, the shielding layer MMN is disposed under the cushion layer CS. In an embodiment, the shielding layer MMN has an electromagnetic shielding function. The shielding layer MMN may block a magnetic field generated from components arranged under the digitizer DTM-2. Accordingly, sensing sensitivity of the digitizer DTM-2 may be increased. The shielding layer MMN according to an embodiment includes magnetic metal powder MMP.

In an embodiment, the shielding layer MMN includes the first shielding layer M-1 and the second shielding layer M-2. The first shielding layer M-1 may overlap the first digitizer T-1. The second shielding layer M-2 may overlap the second digitizer T-2. In an embodiment, the first shielding layer M-1 and the second shielding layer M-2 are spaced apart from each other with the folding area FA interposed therebetween.

The cushion layer CS and the shielding layer MMN are coupled to each other by the seventh adhesive layer AD7. In an embodiment, the seventh adhesive layer AD7 includes the first part AD7-1 overlapping the first non-folding area NFA1 and disposed between the first cushion layer CS-1 and the first shielding layer M-1 and the second part AD7-2 spaced apart from the first part AD7-1 with the folding area FA interposed therebetween and disposed between the first cushion layer CS-1 and the first shielding layer M-1. A thickness of the cushion layer CS according to an embodiment may be in a range of 60 μm to 200 μm.

In an embodiment, the heat dissipating layer CP is disposed under the shielding layer MMN. In an embodiment, the heat dissipating layer CP includes the first heat dissipating layer CP-1 and the second heat dissipating layer CP-2. The first heat dissipating layer CP-1 may overlap the first digitizer T-1. The second heat dissipating layer CP-2 may overlap the second digitizer T-2. In an embodiment, the first heat dissipating layer CP-1 and the second heat dissipating layer CP-2 are spaced apart from each other with the folding area FA interposed therebetween.

In an embodiment, the plate PL-2 is disposed under the heat dissipating layer CP. The plate PL-2 may be coupled to components arranged on the plate PL-2 and function to maintain the shapes of the display module DM and the digitizer DTM-2 and protect the display module DM and the digitizer DTM-2 from an external impact during folding and unfolding operations. The plate PL-2 may be coupled to the housing HM (see FIG. 2A) with an adhesive layer. The plate PL may contain a material having high rigidity, such as metal or plastic.

In an embodiment, the plate PL includes the first support part PN-1, the second support part PN-2, and the folding support part PN-F. The first support part PN-1 may overlap the first digitizer T-1. The second support part PN-2 may overlap the second digitizer T-2. In an embodiment, the first support part PN-1 and the second support part PN-2 are spaced apart from each other with the folding support part PN-F interposed therebetween.

The first support part PN-1 and the second support part PN-2 are coupled to the heat dissipating layer CP by an eighth adhesive layer AD8. In an embodiment, the eighth adhesive layer AD8 includes a first part AD8-1 overlapping the first non-folding area NFA1 and disposed between the first support part PN-1 and the first heat dissipating layer CP-1 and a second part AD8-2 spaced apart from the first part AD8-1 with the folding area FA interposed therebetween, overlapping the second non-folding area NFA2, and disposed between the second support part PN-2 and the second heat dissipating layer CP-2.

The folding support part PN-F according to an embodiment includes the first folding support portion PF-L (e.g., a left folding support) and the second folding support portion PF-R (e.g., a right folding support). In an embodiment, the first folding support portion PF-L and the second folding support portion PF-R are spaced apart from each other within the folding area FA. In this embodiment, there is no center folding support portion PF-C present like that shown in FIG. 8.

The electronic device ED according to the present disclosure further includes a step compensating layer SC-2 for compensating for a step between components overlapping the first and second non-folding areas NFA1 and NFA2 and arranged under the digitizer DTM-2 and the lower portion of the folding area FA. The step compensating layer SC-2 may be a double-sided tape or an insulating film. In an embodiment, the step compensating layer SC-2 includes the first step compensating layer SC-L and the second step compensating layer SC-R. In this embodiment, there is no center step compensating layer SC-C present like that shown in FIG. 8.

According to an embodiment, the step compensating layer SC-2 is disposed on the folding support part PN-F. In more detail, the first step compensating layer SC-L may be disposed on the first folding support portion PF-L. An adhesive layer may be disposed between the first step compensating layer SC-L and the first folding support portion PF-L. The second step compensating layer SC-R may be disposed on the second folding support portion PF-R. An adhesive layer may be disposed between the second step compensating layer SC-R and the second folding support portion PF-R.

The electronic device ED according to the present disclosure further includes a folding shielding layer MMF-2 disposed under the folding area FA and disposed on the step compensating layer SC-2. In an embodiment, the folding shielding layer MMF-2 has an electromagnetic shielding function. Accordingly, sensing sensitivity of the digitizer DTM-2 in the folding area FA may be increased. In an embodiment, the folding shielding layer MMF-2 includes magnetic metal powder MMP. In an embodiment, the folding shielding layer MMF-2 includes the first folding shielding layer M-L and the second folding shielding layer M-R. In this embodiment, no center folding shielding layer M-C is present like that shown in FIG. 8.

According to an embodiment, the first folding shielding layer M-L is disposed on the first step compensating layer SC-L. An adhesive layer may be disposed between the first folding shielding layer M-L and the first step compensating layer SC-L. The second folding shielding layer M-R may be disposed on the second step compensating layer SC-R. An adhesive layer may be disposed between the second folding shielding layer M-R and the second step compensating layer SC-R.

According to an embodiment of the present disclosure, a cushion layer disposed under a digitizer is included, and thus impact resistance of an electronic device may be increased. Further, the cushion layers are spaced apart from each other with a folding area interposed therebetween, and thus the electronic device having increased folding characteristics may be provided.

At least of the embodiments provides an electronic device designed to mitigate impacts on a digitizer that detects external inputs. This device features a display module segmented into two non-folding areas and a central folding area, with the digitizer positioned underneath. Protection is provided by cushion layers aligned with the non-folding areas and shielding layers beneath them, potentially containing magnetic metal powder (MMP) for enhanced protection. This structure effectively absorbs impacts, safeguarding the digitizer's functionality.

Although the description has been made above with reference to embodiments of the present disclosure, it may be understood by those skilled in the art that the present disclosure may be variously modified or changed without departing from the spirit and technical scope of the present disclosure.

What is claimed is:

1. An electronic device comprising:

a display module including a first non-folding area and a second non-folding area spaced apart from each other, and a folding area to be folded about a folding axis, where the folding area is interposed between the first non-folding area and the second non-folding area;

a digitizer disposed under the display module;

a cushion layer disposed under the digitizer and including a first cushion layer overlapping the first non-folding area and a second cushion layer spaced apart from the first cushion layer and overlapping the second non-folding area; and a shielding layer disposed under the cushion layer and including a first shielding layer overlapping the first cushion layer and a second shielding layer spaced apart from the first shielding layer and overlapping the second non-folding area.

2. The electronic device of claim 1, wherein the shielding layer includes magnetic metal powder (MMP).

3. The electronic device of claim 1, further comprising:

a heat dissipating layer disposed under the shielding layer and including a first heat dissipating layer overlapping the first shielding layer and a second heat dissipating layer spaced apart from the first heat dissipating layer and overlapping the second shielding layer.

4. The electronic device of claim 3, further comprising:

a plate disposed under the heat dissipating layer and including a first support part coupled to the first heat dissipating layer, a second support part coupled to the second heat dissipating layer, and a folding support part disposed between the first support part and the second support part.

5. The electronic device of claim 4, wherein the folding support part includes a first folding support portion disposed adjacent to the first non-folding area, a second folding support portion disposed adjacent to the second non-folding area, and a center support portion disposed between the first folding support portion and the second folding support portion, and the electronic device further comprises:

folding shielding layers each disposed between the folding area and the folding support part and including step compensating layers and magnetic metal powder (MMP).

6. The electronic device of claim 5, wherein the step compensating layers are disposed on the first folding support portion, the second folding support portion, and the center support portion, and the folding shielding layers are disposed on the step compensating layers.

7. The electronic device of claim 5, wherein the folding shielding layers are disposed on the first folding support portion, the second folding support portion, and the center support portion, and the step compensating layers are disposed on the folding shielding layers.

8. The electronic device of claim 4, further including an adhesive layer that includes a first adhesive layer disposed between the digitizer and the cushion layer, a second adhesive layer disposed between the cushion layer and the shielding layer, and a third adhesive layer disposed between the shielding layer and the heat dissipating layer, and each of the first adhesive layer, the second adhesive layer, and the third adhesive layer includes a first part overlapping the first non-folding area and a second part spaced apart from the first part with the folding area interposed therebetween and overlapping the second non-folding area.

9. The electronic device of claim 8, wherein each of the first adhesive layer, the second adhesive layer, and the third adhesive layer includes an optical clear adhesive (OCA), an optical clear resin (OCR), or a pressure sensitive adhesive (PSA).

10. The electronic device of claim 1, wherein a thickness of the cushion layer is in a range of 60 μm to 200 μm.

11. The electronic device of claim 1, wherein the digitizer overlaps the folding area, and includes holes.

12. The electronic device of claim 11, further comprising:

a cover pattern disposed under the digitizer to overlap the folding area and cover the holes.

13. The electronic device of claim 1, wherein the digitizer comprises a first digitizer overlapping the first non-folding area and a portion of the folding area and a second digitizer spaced apart from the first digitizer and overlapping the second non-folding area and another portion of the folding area.

14. The electronic device of claim 13, further comprising:

an upper plate disposed on the digitizer, wherein the upper plate overlaps the folding area, and includes holes.

15. The electronic device of claim 14, wherein the upper plate includes a matrix part and a reinforced fiber composite disposed inside the matrix part, and the reinforced fiber composite includes a carbon fiber reinforced plastic (CFRP) or a glass fiber reinforced plastic (GFRP).

16. The electronic device of claim 1, further comprising:

a panel protecting layer disposed between the digitizer and the display module and including a flexible synthetic resin film.

17. The electronic device of claim 1, further comprising:

an upper film disposed on the display module and including a synthetic resin film.

18. The electronic device of claim 17, further comprising:

a window disposed on the upper film, wherein the window includes a thin film glass substrate disposed on the upper film, a window protecting layer disposed on the thin film glass substrate, and an adhesive layer disposed between the thin film glass substrate and the upper film.

19. The electronic device of claim 1, wherein the digitizer includes a plurality of base layers and sensing coils arranged between the base layers and including copper, each of the base layers includes a matrix part and a reinforced fiber composite disposed inside the matrix part, and the reinforced fiber composite includes carbon fiber reinforced plastic (CFRP) or a glass fiber reinforced plastic (GFRP).

20. The electronic device of claim 1, wherein the digitizer is configured to sense an external input in an electromagnetic resonance (EMR) manner.

21. An electronic device comprising:

a display module including a first non-folding area and a second non-folding area spaced apart from each other, and a folding area to be folded about a folding axis, where the folding area is interposed between the first non-folding area and the second non-folding area;

a digitizer disposed under the display module;

a first cushion layer disposed under a first part of the digitizer to overlap the first non-folding area;

a second cushion layer disposed under a second part of the digitizer that is spaced apart from the first part to overlap the second non-folding area;

a first shielding layer disposed under the first cushion layer; and a second shielding layer disposed under the second cushion layer.

22. An electronic device comprising:

a flexible display module segmented into a first non-folding area, a second non-folding area, and an intervening folding area configured to fold about a designated folding axis;

an integrated digitizer disposed beneath the display module, configured to sense input across both the folding and the non-folding areas via electromagnetic resonance;

a protective assembly beneath the digitizer, including:

a first cushion layer positioned under the first non-folding area and a second cushion layer positioned under the second non-folding area spaced apart from the first cushion layer; and a first shielding layer disposed under the first cushion layer and a second shielding layer disposed under the second cushion layer, the first shielding layer providing electromagnetic shielding.

* * * * *